US012416395B1

(12) United States Patent
Moore et al.

(10) Patent No.: US 12,416,395 B1
(45) Date of Patent: Sep. 16, 2025

(54) LIGHTING DEVICE ASSEMBLY WITH DRIVER RAIL MOUNT SYSTEM

(71) Applicant: Troy-CSL Lighting, Inc., City of Industry, CA (US)

(72) Inventors: Kenneth James Moore, Arcadia, CA (US); Eugene Chul Kwak, Irvine, CA (US); Jacob Benjamin Hawkins, Diamond Bar, CA (US)

(73) Assignee: Troy-CSL Lighting, Inc., City of Industry, CA (US)

( * ) Notice: Subject to any disclaimer, the term of this patent is extended or adjusted under 35 U.S.C. 154(b) by 0 days.

(21) Appl. No.: 18/782,928

(22) Filed: Jul. 24, 2024

(51) Int. Cl.

| | |
|---|---|
| ***F21V 21/02*** | (2006.01) |
| ***F21V 15/01*** | (2006.01) |
| ***F21V 17/16*** | (2006.01) |
| ***F21V 23/00*** | (2015.01) |
| ***F21V 29/70*** | (2015.01) |

(52) U.S. Cl.
CPC .............. *F21V 21/02* (2013.01); *F21V 15/01* (2013.01); *F21V 17/164* (2013.01); *F21V 23/007* (2013.01); *F21V 29/70* (2015.01)

(58) Field of Classification Search
CPC ..... F21V 15/01–015; F21V 17/10–168; F21V 21/02–049; F21V 23/003–009; F21V 29/50–71
See application file for complete search history.

(56) References Cited

U.S. PATENT DOCUMENTS 11,454,382 B1 * 9/2022 Wong .................... F21V 21/108

* cited by examiner

*Primary Examiner* — Jason M Han
(74) *Attorney, Agent, or Firm* — Foley & Lardner LLP

(57) ABSTRACT

The arrangements disclosed herein relate to a lighting device assembly includes an optic assembly including a light source, a housing including a front side, a back side, and an opening in the front side, the front side, the back side, and the opening defining a cavity in which the at least a portion of the optic assembly is received, and the housing is configured to secure the lighting device assembly to a wall, a ceiling, or a surface, and a rail mount system coupled to the back side of the housing. The rail mount system includes a rail coupled to the back side of the housing, wherein the rail includes a lead-in portion, a middle portion, and an end portion, wherein the lead-in portion is recessed from the middle portion, the end portion includes a first secure member, and a plate configured to support a driver configured to drive the light source, the plate includes a side flange. The middle portion of the rail forms a channel with the back side of the housing. The side flange is configured to be received in and slidably coupled to the channel, wherein the side flange includes a second secure member at an end of the side flange. The first secure member and the second secure member are configured to engage one another to position the plate at a predetermined position on the back side of the housing.

20 Claims, 29 Drawing Sheets

LIGHTING DEVICE ASSEMBLY WITH DRIVER RAIL MOUNT SYSTEM

BACKGROUND

Certain lighting devices such as, but not limited to, room or area lighting devices, can include configurations that allow for mounting of the lighting device in a recess in a ceiling, wall, or another structure. In certain contexts, it can be desirable to mount the lighting device assembly behind a panel of the ceiling, wall, or another structure, and reduce or minimize the size of an opening through the panel for passing light from the lighting device.

Lighting devices include a light source, such as a Light Emitting Diode (LED). Typically, the brightness of an LED light source is at least partially related to the speed in which heat can be transferred away from the LED component. For example, it can be desirable to maintain the temperature of the LED under about 105° Celsius for improved or maximum light output and efficiency. However, in contexts in which the lighting device is mounted in a ceiling, wall or other object (as in the case of a recessed lighting device), the LED component can be located within an enclosed or poorly ventilated environment within the ceiling, wall or other object, which can inhibit the ability to transfer heat away from the LED. In addition, in contexts in which the lighting device is mounted in a ceiling, wall or other object (as in the case of a recessed lighting device), it can be desirable to provide access to components of the lighting device, during or after mounting the lighting device, e.g., in a plenum, attic space, wall space or other volume space in the ceiling, wall or other object.

SUMMARY

Various lighting device and system examples described herein provide efficient transfer and dissipation of heat away from the LED and other heat generating components such as the driver for the LED, ease of accessibility to components located in a ceiling, wall or other object, ability to mount components and pass light through a relatively small opening in a ceiling, wall or other object, and ease of assembling, installation, dissembling, and removal of the lighting device and system.

In some arrangements, a lighting device assembly includes an optic assembly including a light source, a housing including a front side, a back side, and an opening in the front side, the front side, the back side, and the opening defining a cavity in which the at least a portion of the optic assembly is received, and the housing is configured to secure the lighting device assembly to a wall, a ceiling, or a surface, and a rail mount system coupled to the back side of the housing. The rail mount system includes a rail coupled to the back side of the housing, wherein the rail includes a lead-in portion, a middle portion, and an end portion, wherein the lead-in portion is recessed from the middle portion, the end portion includes a first secure member, and a plate configured to support a driver configured to drive the light source, the plate includes a side flange. The middle portion of the rail forms a channel with the back side of the housing. The side flange is configured to be received in and slidably coupled to the channel, wherein the side flange includes a second secure member at an end of the side flange. The first secure member and the second secure member are configured to engage one another to position the plate at a predetermined position on the back side of the housing.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1A:
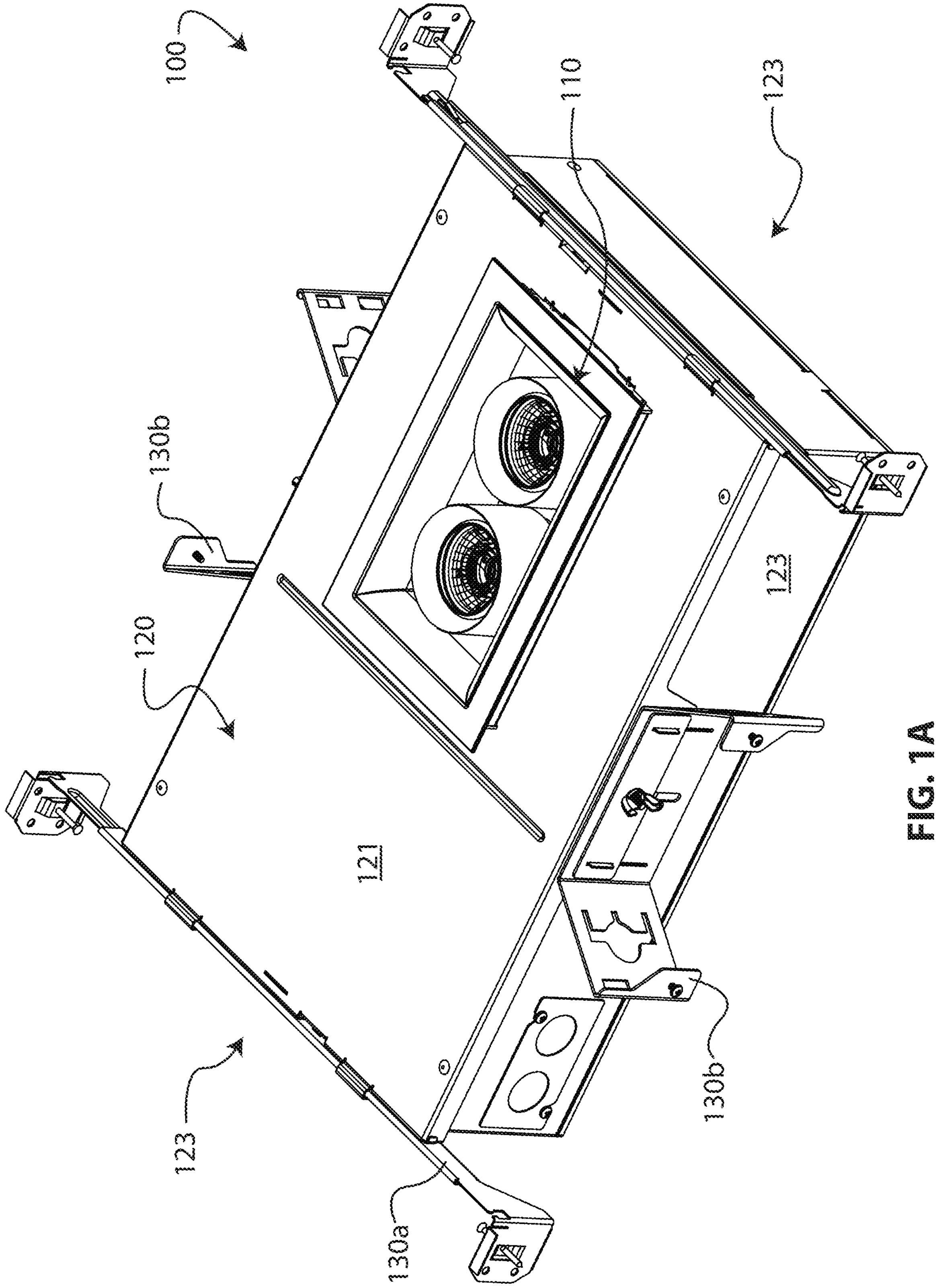
FIG. 1A is a front perspective view of an example of a lighting device assembly, according to various embodiments.

Hereinafter, example embodiments will be described in more detail with reference to the accompanying drawings. The present invention, however, can be embodied or arranged in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

According to various examples described herein, a lighting device assembly or system is configured as a concealed or a recessed lighting device for mounting in a ceiling, wall, surface, or another structure, by locating at least a portion of the lighting device assembly within or behind a ceiling panel, wall panel, or another structure. For example, the lighting device assembly can be configured to be installed in an opening to a plenum, duct or attic space of a ceiling, or in an inner wall space in a manner to appear flush or substantially flush with an exposed surface of a ceiling, wall, or another object. In other examples, variations of the lighting device assembly can be configured to be installed in a manner that is not flush with an exposed surface (and, instead, are configured to be recessed in or protruding from the exposed surface of a ceiling, wall, outer housing, or another object), or is configured to be surface-mounted on the exposed surface of the ceiling, wall, outer housing or other object. In yet other examples, variations of the lighting device assembly can be configured to be mounted on a support structure (such as, but not limited to a sconce structure, pedestal, shaft or the like).

The lighting device assembly includes a lighting device module (e.g., an optic assembly) having at least one light source for generating light and at least one optic member that are configured to emit the light in a cone or another pattern. In examples in which an optic member includes one or more lenses, the axis of the light emission may correspond to an optical axis of the one or more lenses. In other examples, the axis of the light emission may correspond to a center of the light cone or pattern emitted by the light source and optic member.

Certain examples are configured to provide sufficient thermal communication and heat dissipation characteristics to help maintain the temperature of the light source at or below a desired threshold temperature for improved operation. In addition to thermal communication, the lighting device assembly and the lighting module can be configured for ease of manufacture, assembly, or servicing. In particular examples, the lighting device assembly and the lighting module can be configured to allow adjustment of a direction of light emission from the lighting module about multiple axes.

In some examples, the lighting device assembly can be configured to emit light through a relatively small opening in a panel and (or base member), where that relatively small opening has a size and shape through which the lighting device module and the driver electronics may fit (for example, by installing or removing those components in or from the rest of the lighting device assembly). Accordingly, a single, relatively small opening can provide a light outlet opening, and also accommodate selective access to the lighting device module and (or) the driver electronics, without requiring removal of the rest of the lighting device assembly from an installed state.

Lighting Device Assembly 100

Figure 1B:
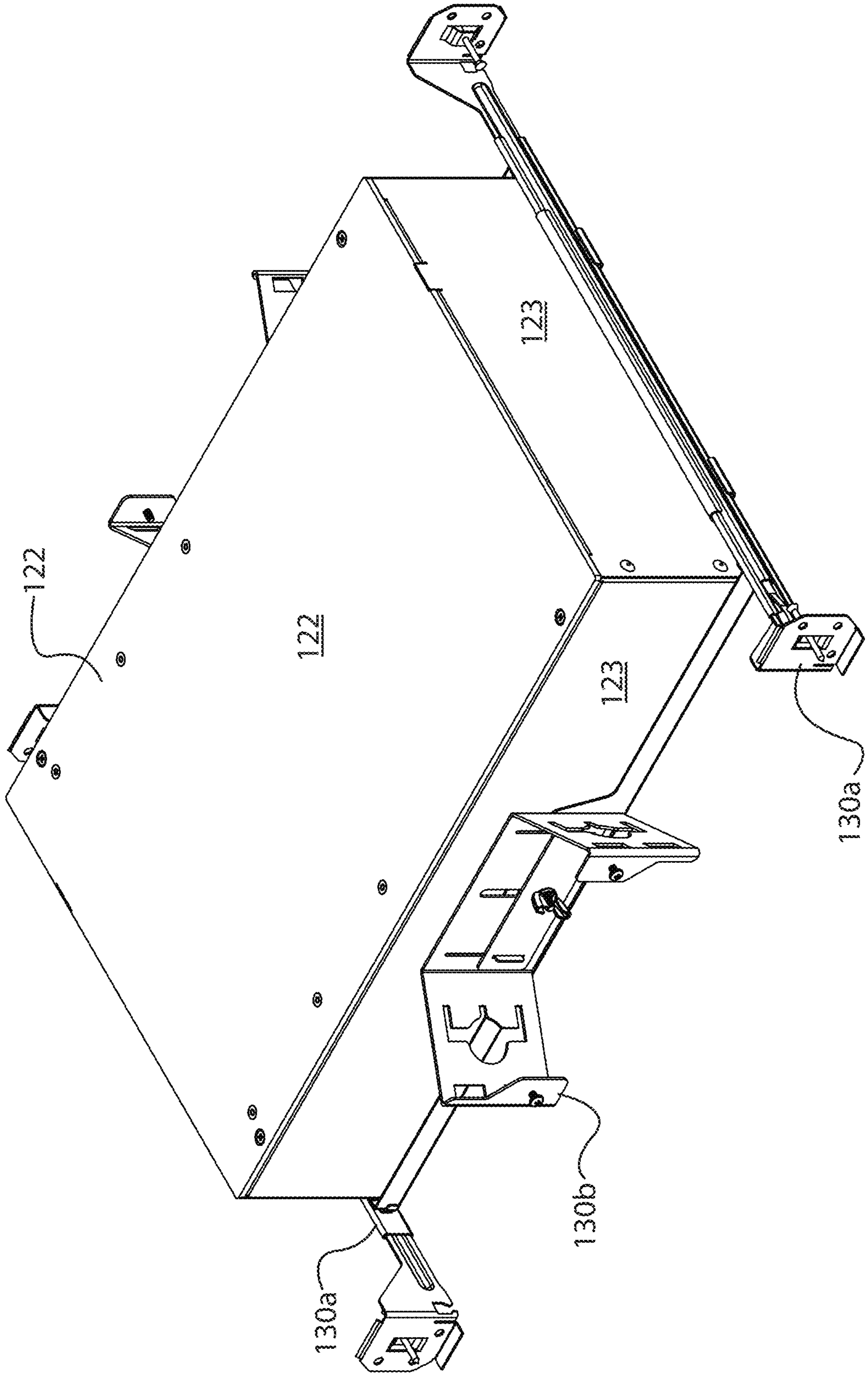
FIG. 1B is a back perspective view of an example of a lighting device assembly, according to various embodiments.
Figure 1C:
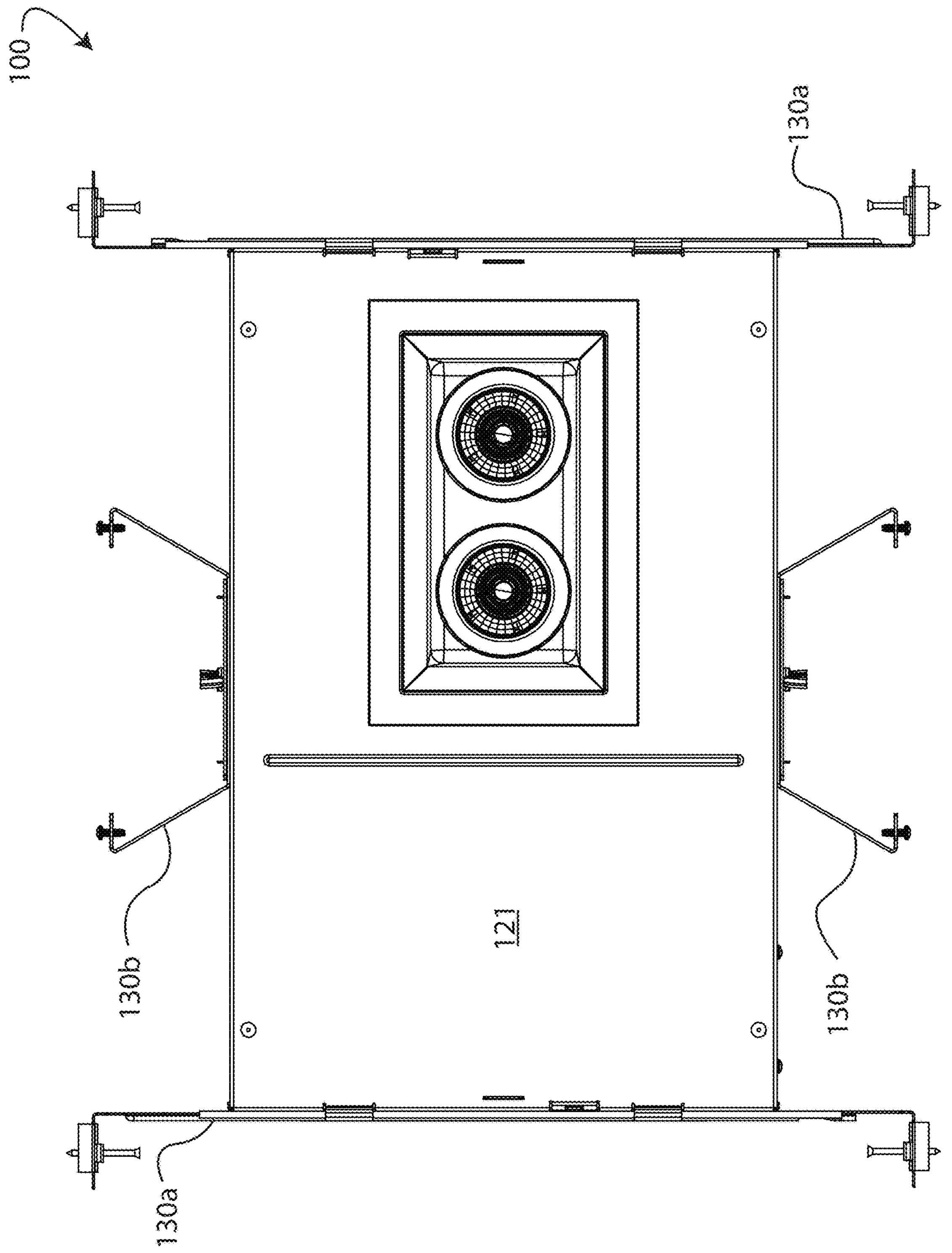
FIG. 1C is a front view of an example of the lighting device assembly, according to various embodiments.
Figure 1D:
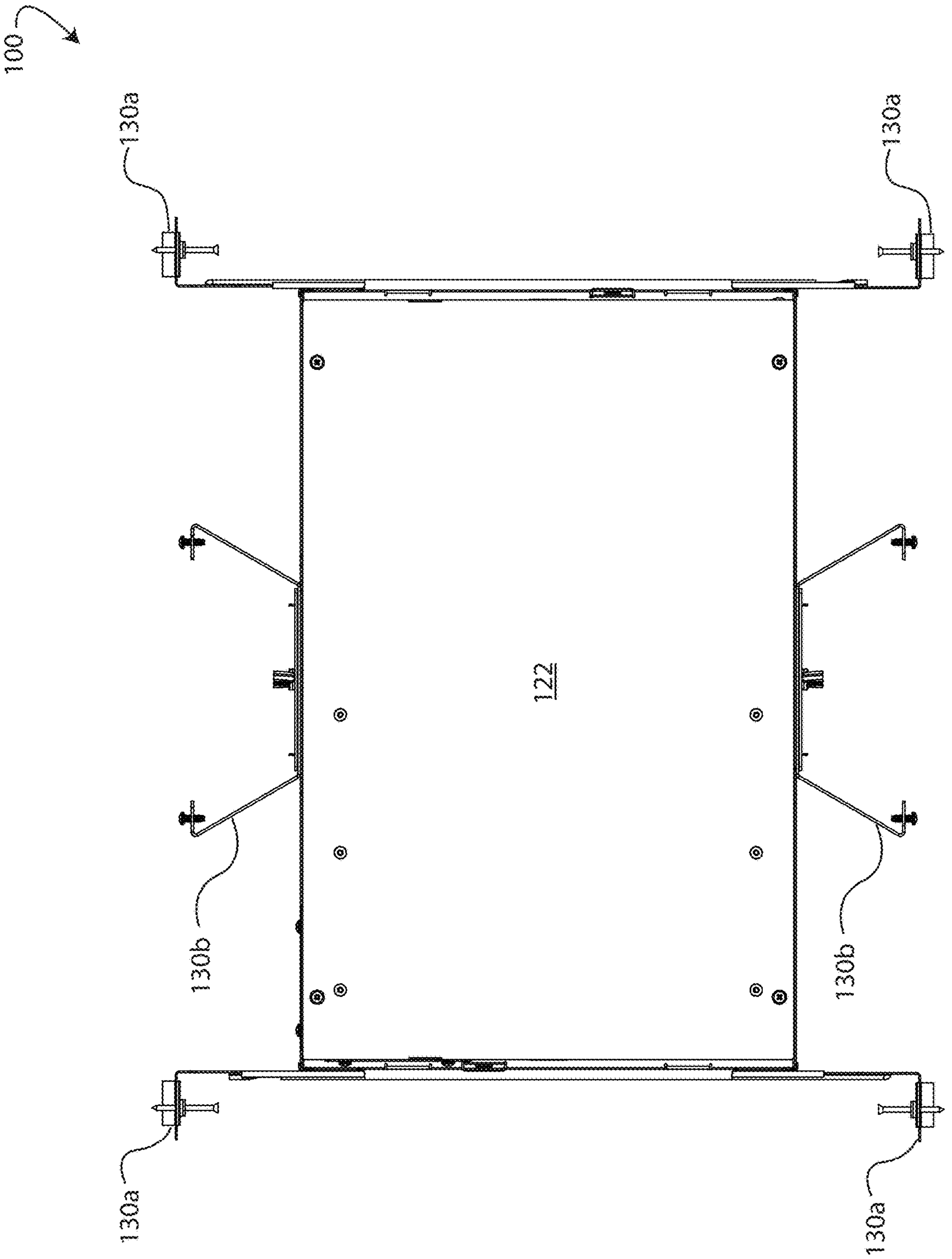
FIG. 1D is a back view of an example of the lighting device assembly, according to various embodiments.
Figure 1E:
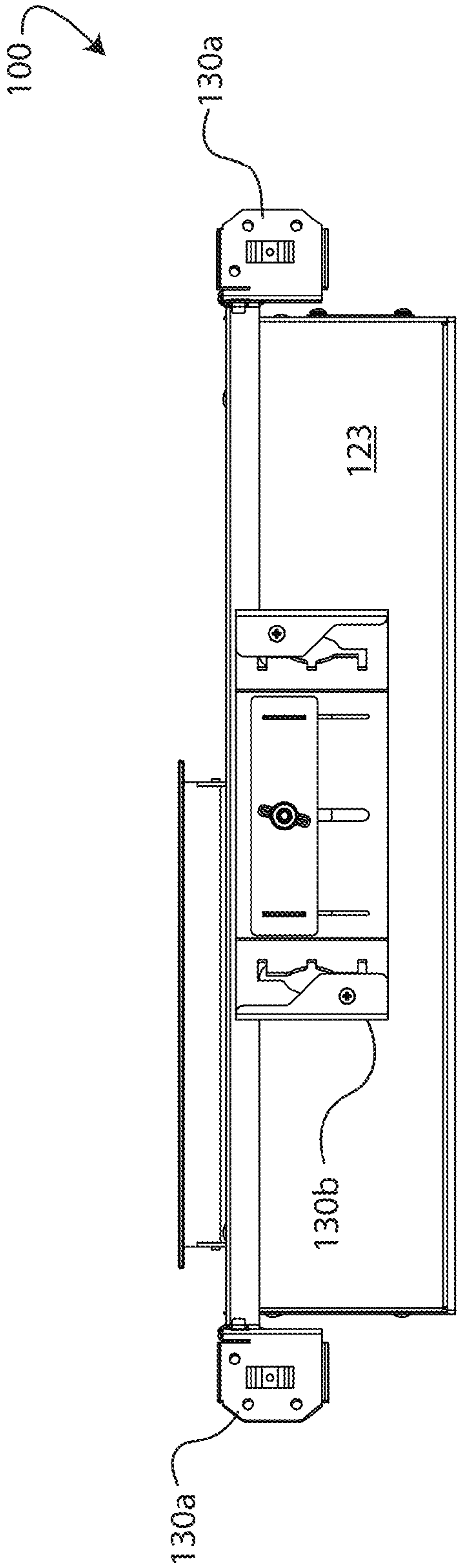
FIGS. 1E and 1F are side views of an example of the lighting device assembly, according to various embodiments.
Figure 1F:
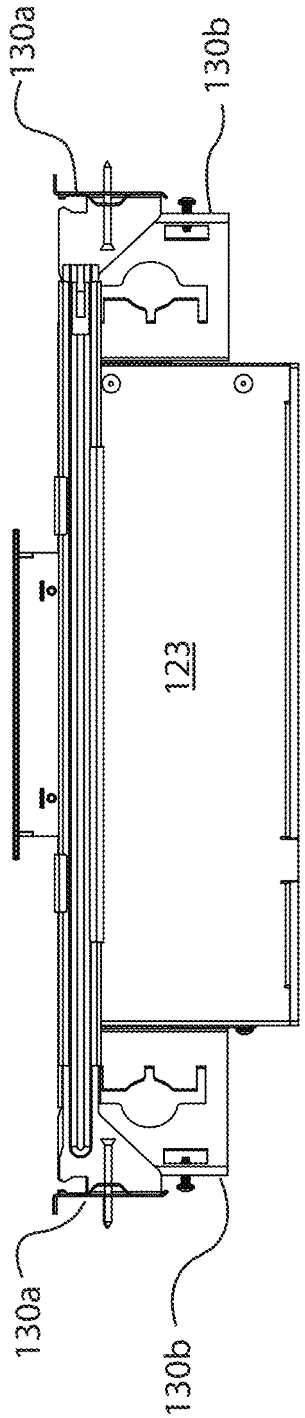

FIG. 1A is a front perspective view of an example of a lighting device assembly 100, according to various embodiments. FIG. 1B is a back perspective view of an example of the lighting device assembly 100, according to various embodiments. FIG. 1C is a front view of an example of the lighting device assembly 100, according to various embodiments. FIG. 1D is a back view of an example of the lighting device assembly 100, according to various embodiments. FIGS. 1E and 1F are side views of an example of the lighting device assembly 100, according to various embodiments.

The lighting device assembly 100 in FIGS. 1A-1F is shown in an assembled state. The lighting device assembly 100 can be attached to or installed on a panel (e.g., a ceiling panel, a wall panel, or a panel of another structure) in which the lighting device assembly 100 is installed or configured to be installed. The lighting device assembly 100 can attached to or installed in a plenum, attic space, wall space, or another volume space in the ceiling, wall, surface, or another object. An individual viewing the lighting device assembly 100 when the lighting device assembly 100 is attached to or installed on the panel can observe the features (e.g., the optic assembly 110) of the lighting device assembly 100 that are not covered by the panel. The lighting device assembly 100 includes an optic assembly 110, a housing 120, and brackets 130*a* and 130*b*.

As used herein, a front direction is a direction in which an optic assembly 110 (e.g., a light source) of the lighting device assembly 100 faces, a direction of the light emission from the light source, and so on. A front side or a front surface face in the front direction. A back direction is a direction opposite to the front direction. A back side or a back surface face in the back direction. In some examples, the front direction and the back direction are opposite directions along an optical axis of the one or more lenses of the lighting device assembly 100. A lateral side or surface extends between the front side or surface and the back side or surface. In some examples, the area for which the optic assembly 110 is arranged to provide lighting is in the front direction relative of the lighting device assembly 100. In some examples, the back side, back surface, lateral side, or lateral surface of the lighting device assembly 100 are at least partially enclosed by the plenum, attic space, wall space, or another volume space in the ceiling, wall, or another object. As used herein a vertical axis is an axis that is or is parallel to the optical axis of the one or more lenses of the lighting device assembly 100. A horizontal axis is an axis that is perpendicular or transverse to the vertical axis. Extending along an axis or dimension refers to extending along a given axis or dimension or along another axis or dimension that is parallel to the given axis or dimension.

The housing 120 includes a front side 121, a back side 122, and a plurality of lateral sides 123. In some examples as shown, the housing 120 has a generally flat, rectangular cuboid, box-like shape. In other examples, the housing 120 may have other suitable shapes or configurations. The housing 120 (e.g., the sides 121, 122, and 123 thereof) can be made of any suitably rigid material and, in particular examples, is made of a material having good (relatively high or fast rate) thermal conduction characteristics, such as, but not limited to a heat dissipating metal, plastic, ceramic or composite material, for dissipation of heat from the optic assembly 110 (e.g., the light source), a driver, and any other heat-generating component mounted on or enclosed within the housing 120. As described in further detail herein, the housing 120 can serve as a heat sink for transferring and dissipating heat from the optic assembly 110, the driver, and any other heat-generating component to a surrounding environment, such as the plenum, attic space, wall space, or another volume space in the ceiling, wall, or another object adjacent to or contacting the housing 120 or the brackets 130*a* and 130*b*. In that regard, the housing 120 (e.g., the sides 121, 122, and 123 thereof) can include one or more plates of material having an appropriate thickness (e.g., greater than 3 mm or 5 mm) for functioning as a heat sink. In some examples, the housing 120 can be made of an electrically conductive metal material (or other electrically conductive material) that can be electrically connected to ground (e.g., to a ground conductor present at the installation site), to provide a grounded barrier around the components of the lighting device assembly 100.

The brackets 130*a* and 130*b* (e.g., hanger bars) are coupled, attached, or fixed to the lateral sides 123 of the housing 120. For example, the brackets 130*a* and 130*b* are coupled to the lateral sides 123 via one or more fasteners (e.g., screws, pins, bolts, etc.). Examples of the brackets 130*a* include adjustable hanger bars located on different opposite lateral sides 123. A bracket 130*a* includes male and female slippers. The male and female slippers can be expanded or collapsed to mount a lateral side within various sizes of spaces. Examples of the brackets 130*b* include butterfly brackets located on different, opposite lateral sides 123. A bracket 130*b* include a middle portion configured to be coupled to a lateral side 123 and a wing on each of two sides of the middle portion. The wing includes holes for receiving one or more fasteners for coupling, attaching, or affixing the wing (along with the lateral side 123) to a beam, plank, frame, ceiling, wall, surface, or another object in the plenum, attic space, wall space, or another volume space.

Similar to the housing 120, the brackets 130*a* and 130*b* can be made of any suitably rigid material and, in particular examples, can be made of a material having good (relatively high or fast rate) thermal conduction characteristics, such as, but not limited to a heat dissipating metal, plastic, ceramic or composite material, for dissipation of heat from the optic assembly 110 (e.g., the light source), a driver, and any other heat-generating component mounted on or enclosed within the housing 120. In some examples, heat from the housing 120 can be transferred, via conduction, to the brackets 130*a* and 130*b*, and the housing 120 and the brackets 130*a* and 130*b* can transfer the heat to the surrounding environment by conduction or convection. In some examples, the surrounding environment refers to plenum, attic space, wall space, or another volume space in the ceiling, wall, or another object in which the lighting device assembly 100 is installed, as well as the area for which the optic assembly 110 is arranged to provide lighting. In some examples, the brackets 130*a* and 130*b* can be made of an electrically conductive metal material (or other electrically conductive material) that can be electrically connected to ground (e.g., to a ground conductor present at the installation site), to provide a grounded barrier around the components of the lighting device assembly 100.

Adjustment Mechanism 200

Figure 2:
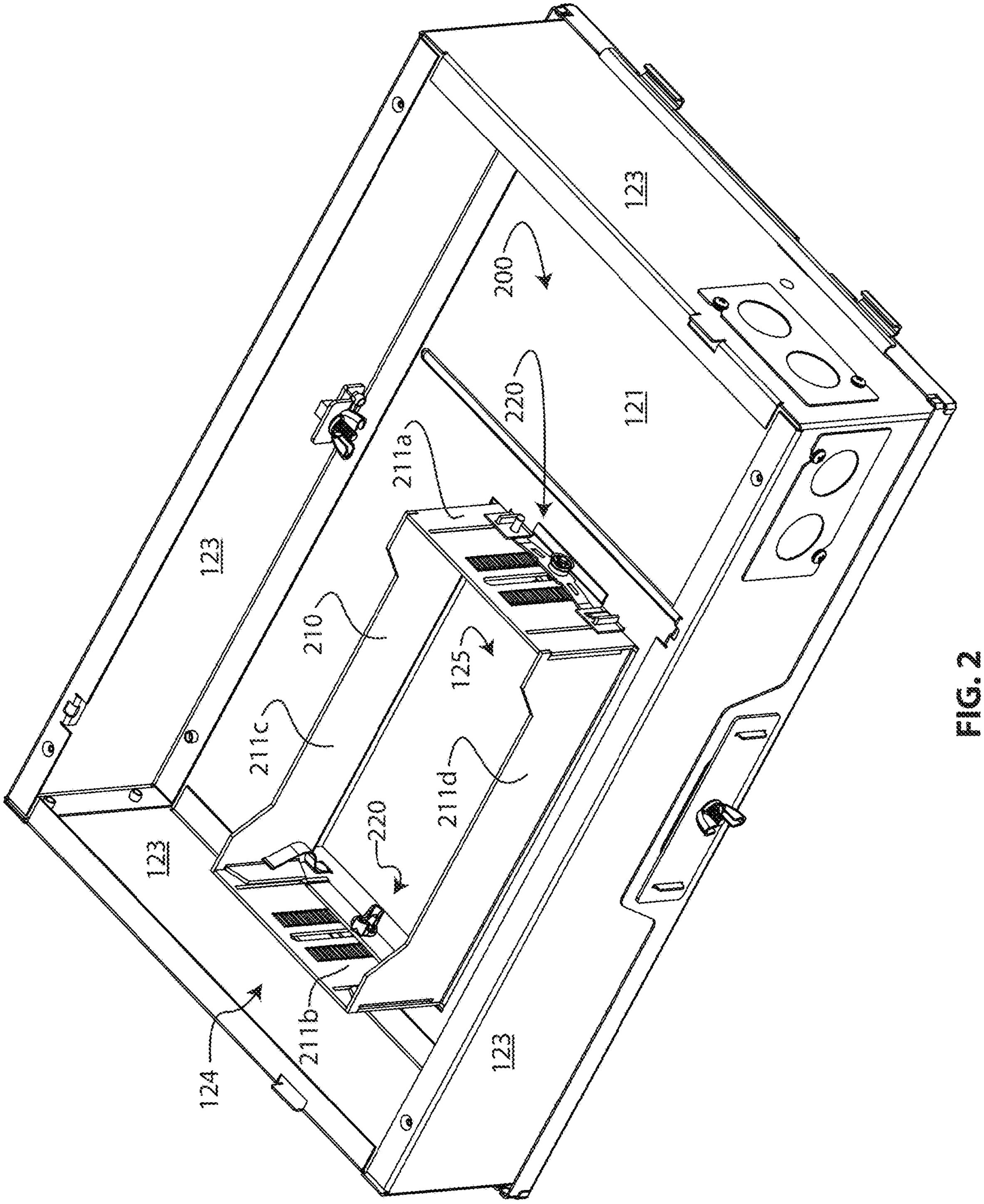
FIG. 2 is a perspective view of a portion of a housing of the lighting device assembly and an adjustment mechanism for adjusting a position of the optic assembly of the lighting device assembly, according to various embodiments.

FIG. 2 is a perspective view of a portion of the housing 120 and an adjustment mechanism 200 for adjusting a position of the optic assembly 110, according to various embodiments. The housing 120 includes or defines a cavity 124 in which the at least a portion of the optic assembly 110 is received. For example, the front side 121, the back side 122, and the lateral sides 123 can be arranged to define and enclose a space or volume of the cavity 124. In cavity 124 can store or hold the optic assembly 110, a driver for driving the optic assembly, wires, cables, and other support structure that support such components.

The housing 120 is configured to secure the lighting device assembly 100 to a wall, a ceiling, or a surface in a plenum, attic space, wall space, or another volume space in the ceiling, wall, or another object. Based on different design requirements and physical dimensions of the installation space (e.g., a plenum, attic space, wall space, or another volume space), a position of the lighting device assembly 100 is adjustable such that a portion of the optic assembly 110 can be exposed from the installation space to appear flush or substantially flush with an exposed surface of a ceiling, wall, or another object. The adjustment mechanism 200 can allow a user to manually adjust the length of extension of the optic assembly 110 extending from the front side 121 of the housing 120 along a vertical axis with efficiency and accuracy, and in some cases without any tools, to facilitate quick deployment of the lighting device assembly 100 during the installation process. The vertical axis is perpendicular to the front side 121 and/or the back side 122 and parallel to one or more lateral sides 123. A horizontal axis is perpendicular or transverse to the vertical axis. For example, to adjust for a thicker wall or wider plenum along the vertical direction, the adjustment mechanism 200 can be used to extend the optic assembly 110 farther relative to the front side 121, whereas to adjust for a thinner wall or narrower plenum along the vertical direction, the adjustment mechanism 200 can be used to retract the optic assembly 110 closer to the front side 121 or more into the cavity 124.

The adjustment mechanism 210 includes a collar 210 coupled to an opening 125 of the housing 120 (e.g., of the front side 121) that defines the cavity 124. For example, the collar 210 includes lateral sides or walls 211*a*, 211*b*, 211*c*, and 211*d* that enclose the opening 125 and define a space for receiving the optic assembly 110. The lateral sides 211*a*, 211*b*, 211*c*, and 211*d* have inner surfaces that face the optic assembly 110 when the optic assembly 110 is coupled to the collar 210. The cavity 124 is accessible through the opening 125. As shown, the opening 125 and the collar 210 may be offset from a center of the front side 121 of the housing 120. Although the opening 125 and the collar 210 are shown to have a rectangular shape, other suitable shapes of the opening 125 and the collar 210 that conform to a shape of the cover or housing of the optic assembly 110 can be likewise implemented. The collar 120 can be adjustably coupled, supported, or attached to the front side 121 of the housing 120 at or adjacent to the opening 125. The optic assembly 110 can be inserted into an interior space of the collar 210 by a user. The optic assembly 110 is removably coupled to the collar 210. An orientation of the light source in the optic assembly 110 is configured to adjustable by pivoting the light source within the optic assembly 110.

The collar 210 is fixed relative to the optic assembly 110 when the optic assembly 110 is coupled to the collar 210 and is configured to be adjusted relative to the housing 120 (e.g., to the front side 121). In other words, the position of the optic assembly 110 relative to the housing 120 can be adjusted by adjusting the position of the collar 120 relative to the housing. By providing an intermediate component such as the collar 210 to facilitate adjustment of the optic assembly 110, the lighting device assembly 100 can use any type of optic assembly 110 (e.g., any size of shape of the optic assembly 110, any number of light sources, etc.) including off-the-shelf optic assemblies and especially-designed optic assemblies for specific purposes and functions.

The collar 210 includes or is coupled to an adjustment member 220 that is configured to adjust, relative to the housing 120 (e.g., the front side 121), at least one of a position of the collar 210, a position of the optic assembly 110, or a position of the light source in the optic assembly 110. In some examples, a first portion of the collar 210 is within the cavity 124 and a second portion of the collar 210 is external to the cavity 124 and extends beyond the front side 121 (e.g., the front surface of the front side 121). In some examples, another portion of the optic assembly 110 is external to the cavity 124 and extends beyond the front side 121 (e.g., the front surface of the front side 121).

Figure 3A:
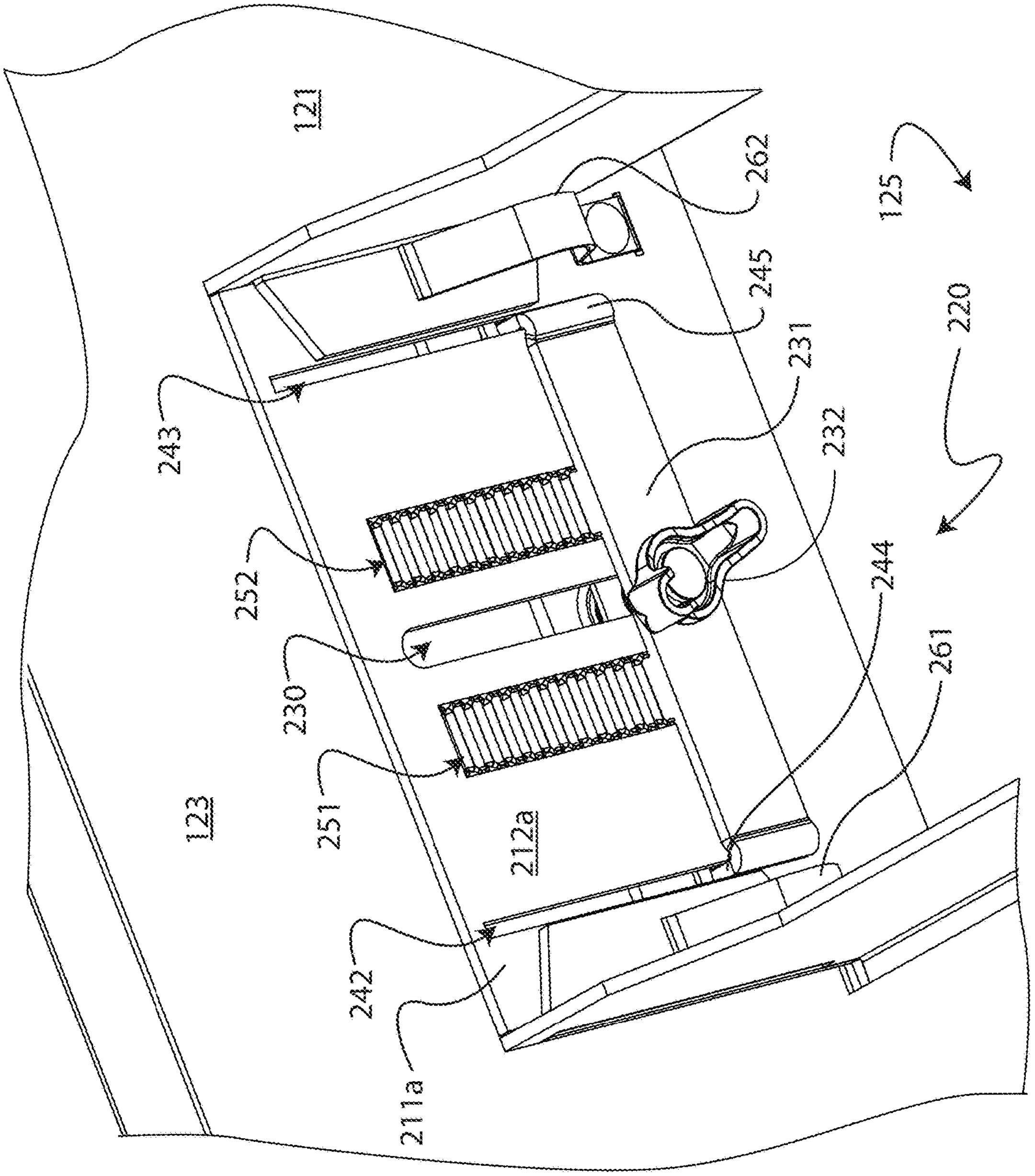
FIG. 3A shows a first side of an example adjustment member for adjusting the collar and the optic assembly relative to the housing, according to some embodiments.
Figure 3B:
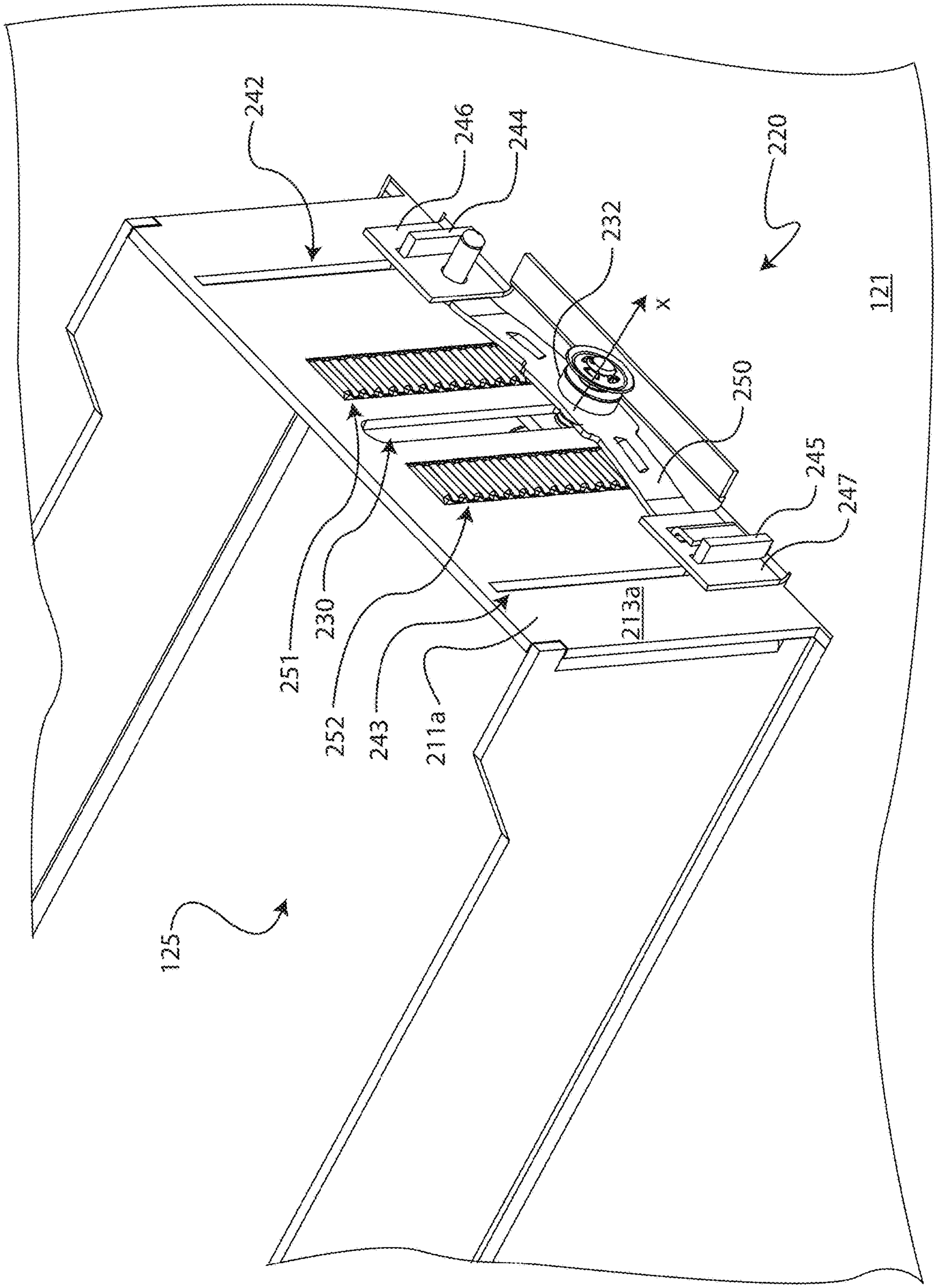
FIG. 3B illustrates a second side of an example adjustment member for adjusting the collar and the optic assembly relative to the housing, according to some embodiments.
Figure 3C:
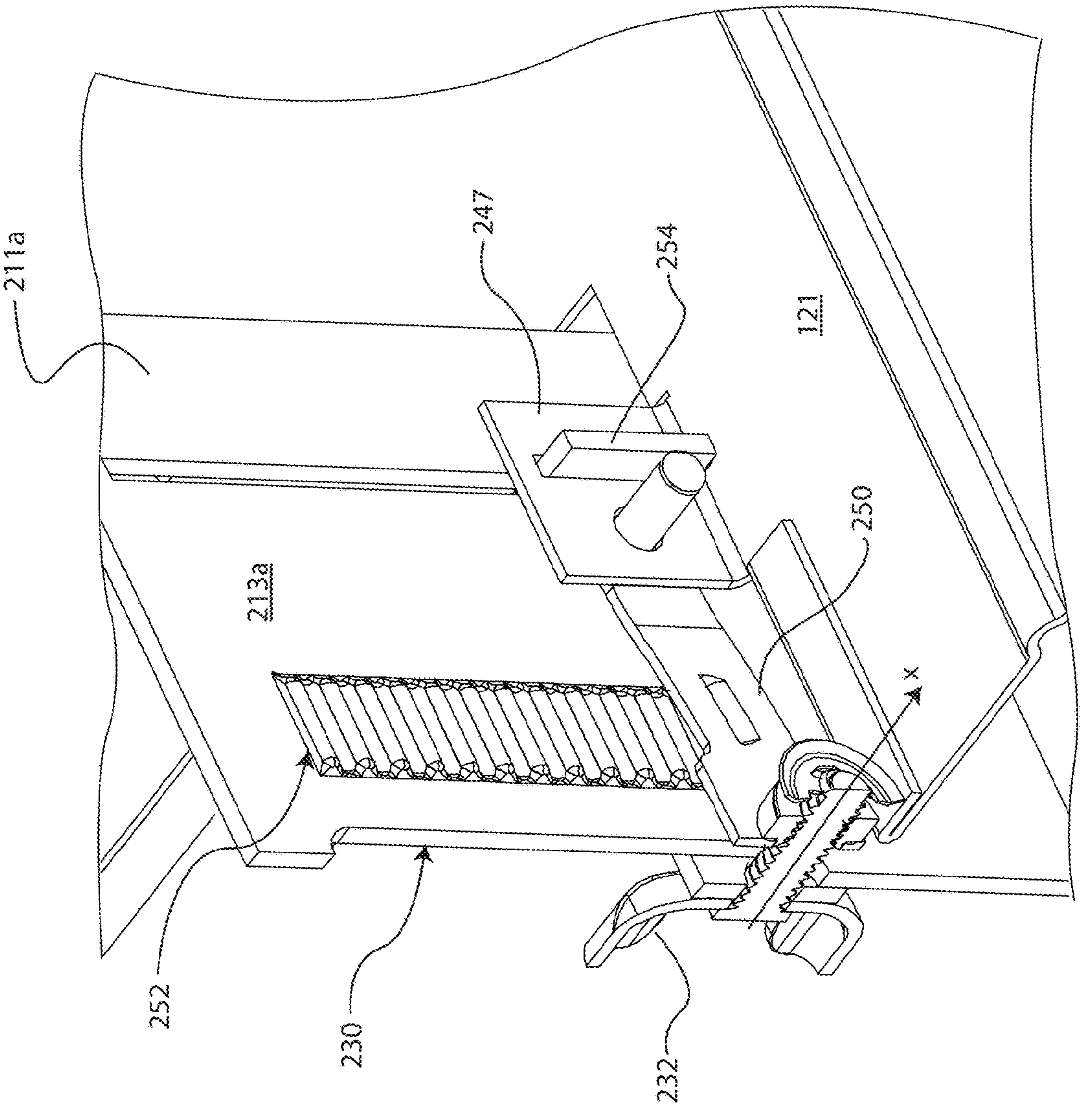
FIG. 3C illustrates an example adjustment member for adjusting the collar and the optic assembly relative to the housing, including a partial cross-sectional view of a fastener and a first groove, according to some embodiments.

FIG. 3A shows a first side of an example adjustment member 220 for adjusting the collar 210 and the optic assembly 110 relative to the housing 120, according to some embodiments. FIG. 3B illustrates a second side of an example adjustment member 220 for adjusting the collar 210 and the optic assembly 110 relative to the housing 120, according to some embodiments. FIG. 3C illustrates an example adjustment member 220 for adjusting the collar 210 and the optic assembly 110 relative to the housing 120, including a partial cross-sectional view of the fastener 232 and a first groove 230, according to some embodiments.

The first side of the adjustment member 220 and the second side of the adjustment member 220 are opposite sides of the adjustment member 220, which is located on or adjacent to the lateral side 211*a* of the collar 210. For example, FIG. 3A shows the first side of the adjustment member 220 on an inner surface 212*a* of the lateral side 211*a* of the collar 210, and FIG. 3B shows the second side of the adjustment member 220 on an outer surface 213*a* of the lateral side 211*a* of the collar 210. The inner surface 212*a* of the lateral side 211*a* faces the optic assembly 110 when the optic assembly 110 is coupled to the collar 210. The outer surface 213*a* faces a direction opposite to the inner surface 212*a* and faces away from the optic assembly 110 when the optic assembly 110 is coupled to the collar 210. The same adjustment member 220 is located on or adjacent to the lateral side 211*b* of the collar 210.

The adjustment member 220 includes a first groove 230 on the lateral side 212*a* that extends along a vertical axis of the lateral side 212*a*. The first groove 230 is an elongated, oblong cutout from the lateral side 212*a*. In some examples, the first groove 230 is located in the center or substantially the center of the lateral side 212*a*. The adjustment member 220 further includes a guide plate 231 and a fastener 232. The guide plate 231 is slidably coupled to the lateral side 212*a*. The fastener 232 is configured to fasten the guide plate 231 to the first groove 230 at a location along the vertical axis or the vertical dimension of the first groove 230. The guide plate 231 includes a hole, which is configured to be aligned to (e.g., checks in, mates with, combines with, slots into, etc.) the first groove when the guide plate 231 is slidably coupled to the lateral side 212*a*. The fastener 232 extends through the hole and the first groove 230 at the location along the vertical axis of the first groove 230 to fasten the guide plate 231 to the first groove 230 at that location.

Examples of the fastener 232 include at least one of a pin, a screw (e.g., a winged screw, a thumb screw), a nut (e.g., a winged nut, a thumb nut), a threaded stud, an insert, or a bolt. In some examples, the fastener 232 allows a user to fasten the guide plate 231 without the use of tools in view of the small and narrow opening 125. The hand of the user can reach fastener 232 through the opening 125 (before the optic assembly 110 is inserted into the collar 210) to tighten the fastener 232 at a desired location along the vertical axis of the first groove 230. In that regard, as shown, the fastener 232 includes a winged screw with the wing portion on the inner surface 212*a* of the lateral side 211*a* and protruding into the opening 125. The corresponding nut is located on the outer surface 213*a* of the lateral side 211*a* to receive the threaded portion of the winged screw. In other examples, the fastener 232 includes a winged nut with the wing portion on the inner surface 212*a* of the lateral side 211*a* and protruding into the opening 125. The corresponding threaded bolt is located on the outer surface 213*a* of the lateral side 211*a* to be threaded into the winged nut. Other examples of fasteners 232 that allows easy manual fastening or fastening using tools (e.g., a tong or a screwdriver) can be likewise implemented.

The adjustment member 220 includes one or more groves (e.g., a second groove 242 and a third groove 243) each extending along a vertical axis of the lateral side 212*a* of the collar 210. Each of the second groove 242 or the third groove 243 is an elongated cutout from the lateral side 212*a*. In some examples as shown, the grooves 242 and 243 are located on either side of the first groove 230. In other words, the first groove 230 is between the second groove 242 and the third groove 243 along a horizontal axis perpendicular or transverse to the vertical axis.

The guide plate 231 includes one or more engagement portions (e.g., a first engagement portion 244 and a second engagement portion 245), each of which is configured to be inserted into a respective one of the second groove 242 or the third groove 243 and slidably coupled to the lateral side 211*a* of the collar 210 via the respective one of the second groove 242 or the third groove 243. As shown, the guide plate 231 includes the engagement portions 244 and 245 on the edges of the guide plate 231 and a middle portion between the engagement portions 244 and 245. The fastener 232 and the corresponding hole of the guide plate 231 are located in the middle portion of the guide plate 231. The middle portion of the guide plate 231 appears to be a flat elongated piece of material, and the engagement portions 244 and 245 are bent at an angle (e.g., 90° or approximately 90°) relative to the middle portion, such that the guide plate 231 appears to have an “U” shape. The guide plate 231, including the middle portion and the engagement portions 244 and 245 can be formed from a single piece of material.

The engagement portions 244 and 245 of the guide plate 231 are each configured to be located at a location along the vertical axis of a respective one of the second groove 242 or the third groove 243. The location along the vertical axis of the first groove 230 on which the guide plate 231 is fastened (by the fastener 232) corresponds to (e.g., is aligned with) the locations along the vertical axis of the second groove 242 or the third groove 243 on which the engagement portions 244 and 245 are located. That is, the engagement portions 244 and 245 are configured to be moved (e.g., by sliding) relative to the grooves 242 and 243 to correspond to the movement of the fastener 232 along the first groove 230, vice versa.

The engagement portions 244 and 245 are bent around the inner surface 212*a* of the lateral side 211*a* to protrude from the outer surface 213*a* of the lateral side 211*a* through the grooves 242 and 243, and are secured at the outer surface 213*a* of the lateral side 211*a* via respective buckles 246 and 247. In some examples, the buckles 246 and 247 can extend from a surface of the front side 121. In some examples, the buckles 246 and 247 can be a portion of the front side 121 that is bent upward at an angle (e.g., 90° or approximately 90°) relative to the rest of the front side 121. The buckles 246 and 247 secure the engagement portions 244 and 245 and therefore the guide plate 231 at fixed positions relative to the housing 120 (e.g., the front side 121).

In some examples, a length of the first groove 230 along the vertical axis defines an adjustment range for the at least one of the position of the collar 210, the position of the optic assembly 110, or the position of the light source in the optic assembly 110. At least one of the position of the optic assembly 110, or the position of the light source in the optic assembly 110 is defined by extension of at least one of the collar 210 or the light source from the housing 120. For example, the fastener 232 fastening the guide plate 231 at the location corresponding to a first end (e.g., a back end) of the first groove 230 corresponds to a maximum extension of at least one of the collar 210 or the light source from the housing 120. For example, the fastener 232 fastening the guide plate 231 at the location corresponding to a second, opposite end (e.g., a front end) of the first groove 230 corresponds to a minimum extension of at least one of the collar 210 or the light source from the housing 120.

Figure 4A:
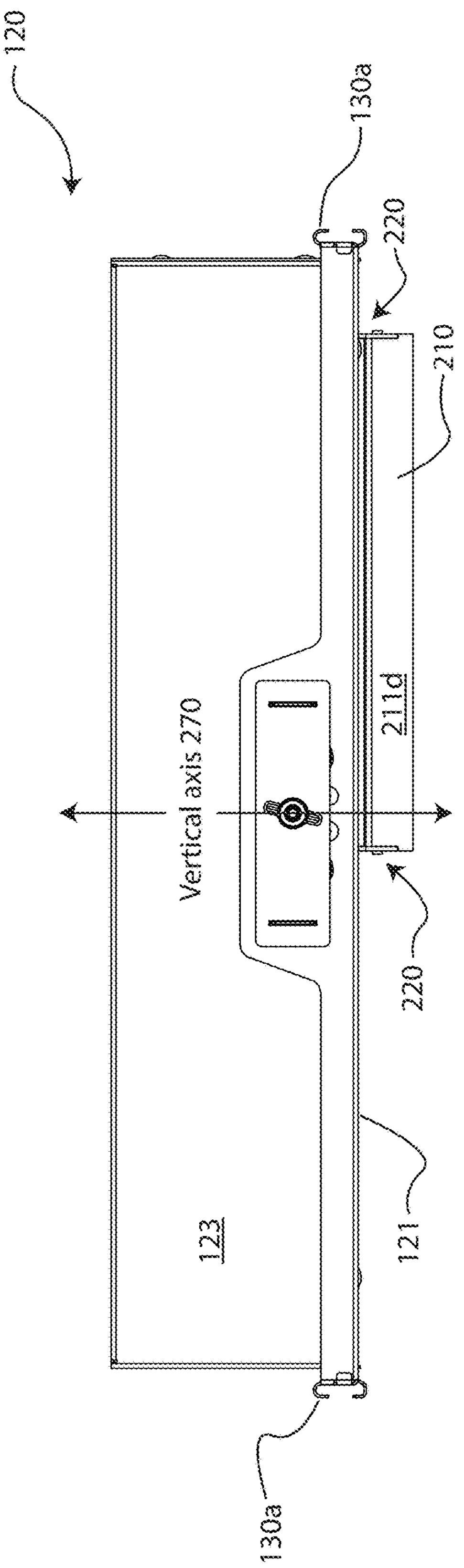
FIG. 4A illustrates a first position of a collar relative to the housing, according to some embodiments.
Figure 4B:
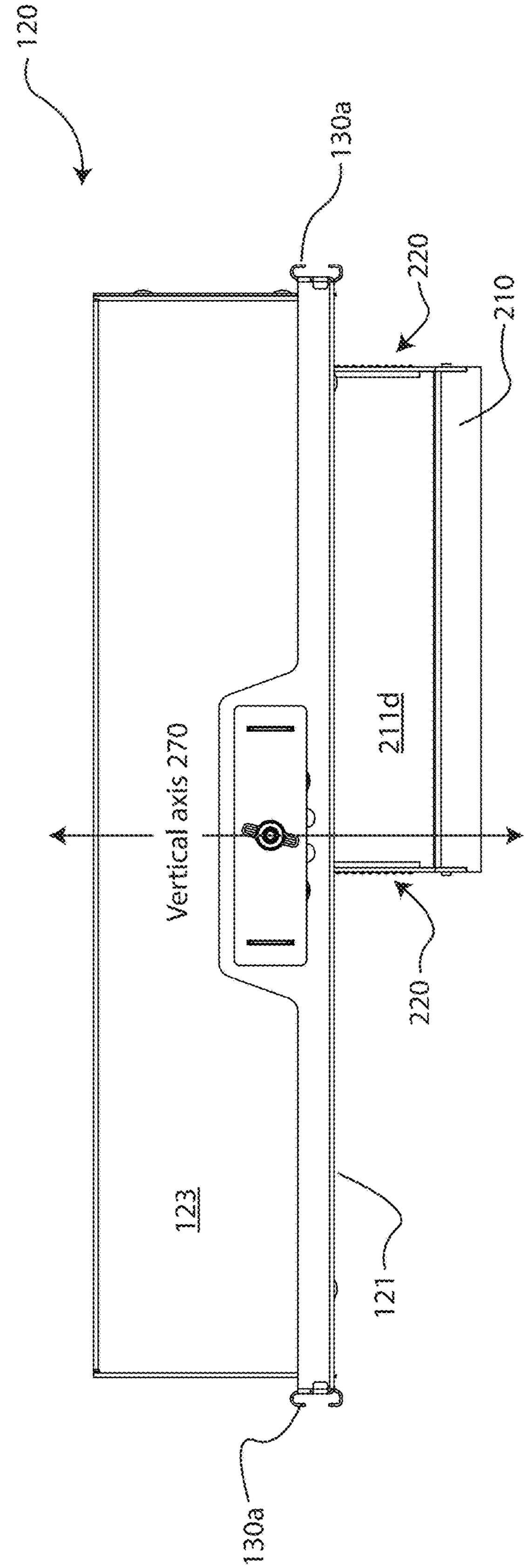
FIG. 4B illustrates a second position of the collar relative to the housing, according to some embodiments.

FIG. 4A illustrates a first position of a collar 210 relative to the housing 120 (e.g., the front side 121) along a vertical axis 270, according to some embodiments. FIG. 4B illustrates a second position of the collar 210 relative to the housing 120 (e.g., the front side 121), according to some embodiments. The fastener 232 of the adjustment member 220 fastening the guide plate 231 at a first location of the first groove 230 corresponds to the first position of the collar 210 (and therefore of the light source) from the housing 120 (e.g., the front side 121), as shown in FIG. 4A. The fastener 232 of the adjustment member 220 fastening the guide plate 231 at a second location of the first groove 230 corresponds to the second position of the collar 210 (and therefore of the light source) from the housing 120 (e.g., the front side 121), as shown in FIG. 4B. As shown, at the first position of the collar 210, the collar 210 extends more from the front side 121 of the housing 120 as compared to the collar 210 at the second position. The first location of the first groove 230 on which the guide plate 231 is fastened is closer to the back end of the first groove 230 as compared to the second location of the first groove 230. The second location of the first groove 230 on which the guide plate 231 is fastened is closer to the front end of the first groove 230 as compared to the first location of the first groove 230.

The adjustment member 220 includes one or more interference patterns 251 and 252 on the lateral side 211*a* extending along the vertical axis of the lateral side 211*a*. In some examples, the interference patterns 251 and 252 define a plurality of steps along the vertical axis. As shown, the adjustment member 220 includes a first interference pattern 251 and a second interference pattern 252 on the lateral side 211*a* extending along the vertical axis of the lateral side 211*a*. The fastener 232 is configured to fasten the guide plate 231 to the first interference pattern 251 at or over at least one of the plurality of steps of the first interference pattern 251 and to the second interference pattern 252 at or over at least one of the plurality of steps of the second interference pattern 252 when the fastener 232 fastens the guide plate 231 to the first groove 230 at the location along the vertical axis of the first groove 230. The fastener 232 is configured to fasten the guide plate 231 to the interference patterns 251 and 252 at or over at least one of the plurality of steps when the fastener 232 fastens the guide plate 231 to the first groove 230 at the location along the vertical axis of the first groove 230. The first groove 230 is between the first interference pattern 251 and the second interference pattern 252 along a horizontal axis perpendicular or transverse to the vertical axis. The first interference pattern 251 and the second interference pattern 252 are between the second groove 242 and the third groove 243 along the horizontal axis.

In some examples, each of the interference patterns 251 and 252 includes a louver having a plurality of slats, each of the plurality of slats corresponds to one of the plural of steps. In some examples, each of the interference patterns 251 and 252 includes a set of alternating depressions and protrusions arranged along the vertical axis, each of the depressions or each of the protrusions corresponds to one of the plural of steps. As shown, the interference patterns 251 and 252 are formed directly on the lateral side 211*a* (e.g., etched, pressed, cut, punched, bent, welded, etc.) to reduce cost and manufacturing time and complexity. In other examples, the interference patterns 251 and 252 can be formed separate from the lateral side 211*a* and attached to the lateral side 211*a*.

The steps (e.g., slats, depressions, protrusions, etc.) of the interference patterns 251 and 252 can have a regular spacing, such that the distance between two adjacent steps remains the same in the interference patterns 251 and 252. The total length of the interference patterns 251 and 252 along the vertical axis and the spacing of the interference patterns 251 and 252 can be defined according to standardized dimensions for different design requirements and physical dimensions of the installation space. As such, the steps provides indication of predefined incremental distances for adjusting the position of the collar 210. In addition to providing visual indication, the steps can also provide tactile feedback for a user adjust the position of the guide plate 231. As the fastener 232 is loosened and the user can adjust the position of the guide plate 231, the guide plate 231 contacting a surface of each step (e.g., each protrusion) generates a friction force that temporarily causes additional resistance in moving the guide plate 231 while moving the guide plate 231 across the space between two steps (e.g., each depression) lacks such friction force, causing the user to feel that it is easier to move the guide plate 231. The steps can also provide additional friction force when the guide plate 231 is fastened to the steps, thus facilitating a tighter and stronger coupling for the collar 210 and the optic assembly 110.

The adjustment member 220 includes a back plate 250 slidably coupled to (the outer surface 213*a*) the lateral side 211*a* of the collar 210. The guide plate 231 and the back plate 250 are located on opposite surfaces 212*a* and 213*a* of the lateral side 211*a*. The guide plate 231 is coupled to the back plate 250. At least one of the guide plate 231 or the back plate 250 is fixed relative to the housing 120. The buckles 246 and 247 which secure the engagement portions 244 and 245 also secure the ends of the back plate 250, thus affixing the back plate 250 to the guide plate 231, vice versa. As shown, the buckle 246 secures both the engagement portion 244 and one end of the back plate 250, and the buckle 247 secures both the engagement portion 245 and the other end of the back plate 250. The coupling of the back plate 250 and the guide plate 231 via the buckles 246 and 247 also prevents the collar 210 from being pulled out from the housing 120 through the opening 125.

In some examples, the back plate 250 is or includes a lock spring, which is a flexible piece of material (e.g., metal) that has a curved shape (a middle portion is curved toward the x direction) and suitable resilience to return to its curved shape. The fastening of the fastener 232 is configured to pull the lock spring toward the interference patterns 251 and 252 of the lateral side 211*a* (in a direction opposite to direction x) and pull the lock spring to engage with or contact the patterns 251 and 252 (e.g., the steps thereof). Thus, fastening of the fastener 232 causes the lock spring to flatten. Loosening of the fastener 232 causes the lock spring to return to its curved shape due to its spring force and moving away from the interference patterns 251 and 252 of the lateral side 211*a*. In this manner, the lock spring allows the user to easily loosen the fastener 232 without catching the fastener 232, the guide plate 231, or the back plate 250 on the steps of the interference patterns 251 and 252 if the fastener 232 is not sufficiently loosened.

In some examples, the lateral side 211*a* includes at least one protruding member 261 and 262 (e.g., a clip, indexing feature, slot, guide, etc.) configured to hold the optic assembly 110 when the optic assembly 110 is coupled to the collar 210. Each of the protruding members 261 and 262 extends from the lateral side 211*a* toward the opening 125. When the optic assembly 110 is inserted into the opening 125, the external surfaces of the protruding member 260 facing the opening 125 engages or contacts the optic assembly 110 and holds the optic assembly 110 in place via a friction fit. For example, the protruding members 261 and 262, which has a cantilevered clip shape, bends when the optic assembly 110 comes in contact with the bulge portion of the protruding members 261 and 262, and the resulting spring force exerts friction force onto the optic assembly 110. The grooves 230, 242, 243, the interference patterns 251 and 252, the guide plate 231, and the fastener 232 are between the protruding members 261 and 262.

A height in which each of the protruding members 261 and 262 extends toward the opening 125 (e.g., in a direction that is normal to the inner surface 212*a* of the lateral side 211*a*), even when the protruding members 261 and 262 are deformed when supporting the optic assembly 110, is greater than a height in which the fastener 232 extends (e.g., in the direction that is normal to the inner surface 212) toward the opening 125. The protruding members 261 and 262 having a greater profile into the opening 125 than that of the fastener 232 prevents the collision between the optic assembly 110 and the fastener 232 when the optic assembly 110 is being supported by the protruding members 261 and 262. In other words, a space is formed between the optic assembly 110 and components including the fastener 232, the inner surface 212*a*, and the guide plate 231 when the optic assembly 110 is being supported by the protruding members 261 and 262.

The opposite lateral side 211*b* similarly includes the protruding members 261 and 262, such that the friction forces from both opposing lateral sides 211*a* and 211*b* clutch, pitch, or grip the optic assembly 110 in place.

Similar to the housing 120 and the brackets 130*a* and 130*b*, the collar 210 and the components thereof can be made of any suitably rigid material and, in particular examples, can be made of a material having good (relatively high or fast rate) thermal conduction characteristics, such as, but not limited to a heat dissipating metal, plastic, ceramic or composite material, for dissipation of heat from the optic assembly 110 (e.g., the light source), a driver, and any other heat-generating component mounted on or enclosed within the housing 120. In some examples, heat from optic assembly 110 can be transferred, via conduction, to the collar 210, which in turn transfers the heat to the housing 120, which in turn transfers the heat to the brackets 130*a* and 130*b*, and the housing 120 and the brackets 130*a* and 130*b* can transfer the heat to the surrounding environment by conduction or convection.

Optic Assembly 110

Figure 5A:
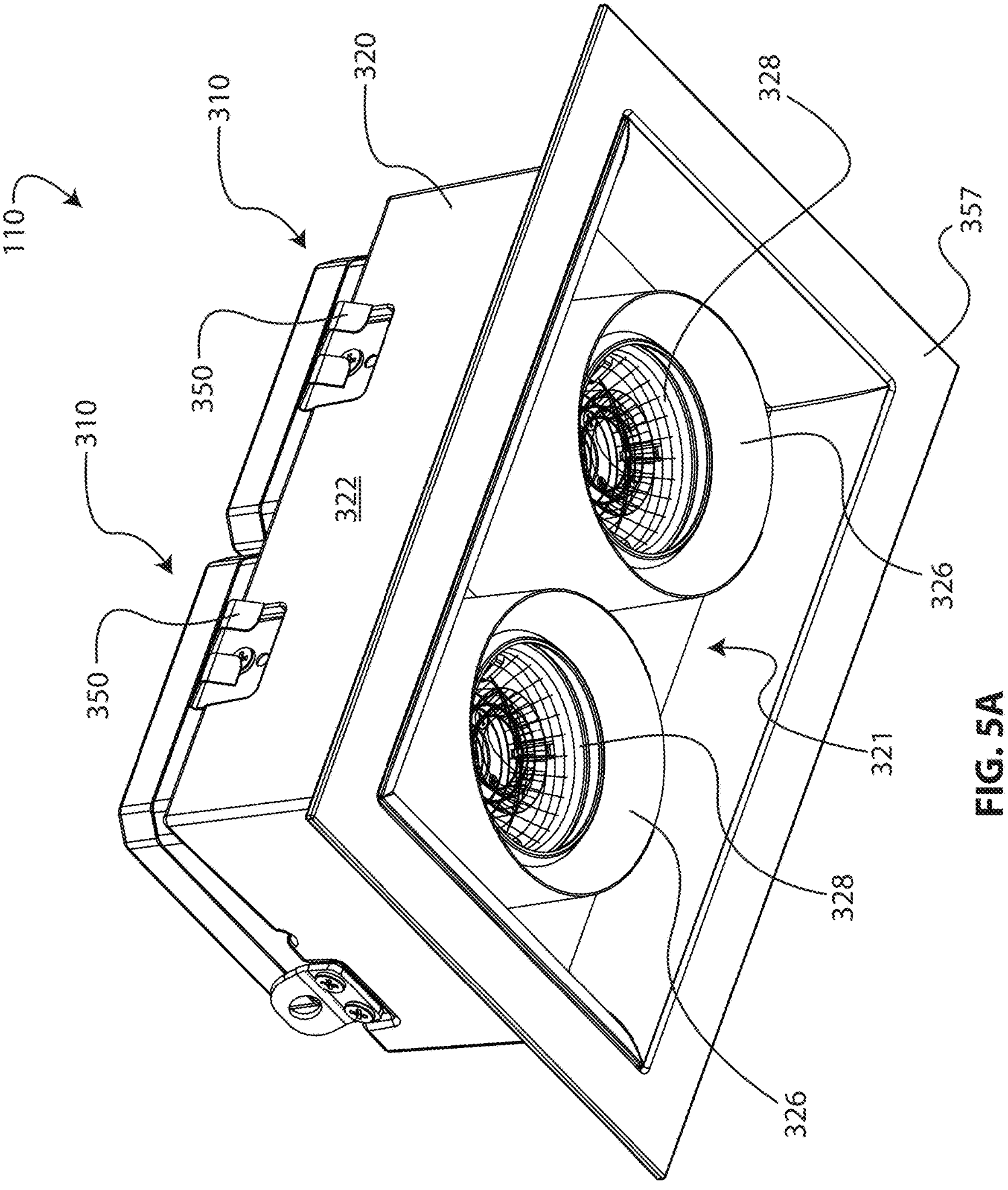
FIG. 5A is a front perspective view of an example of the optic assembly, according to various embodiments.
Figure 5B:
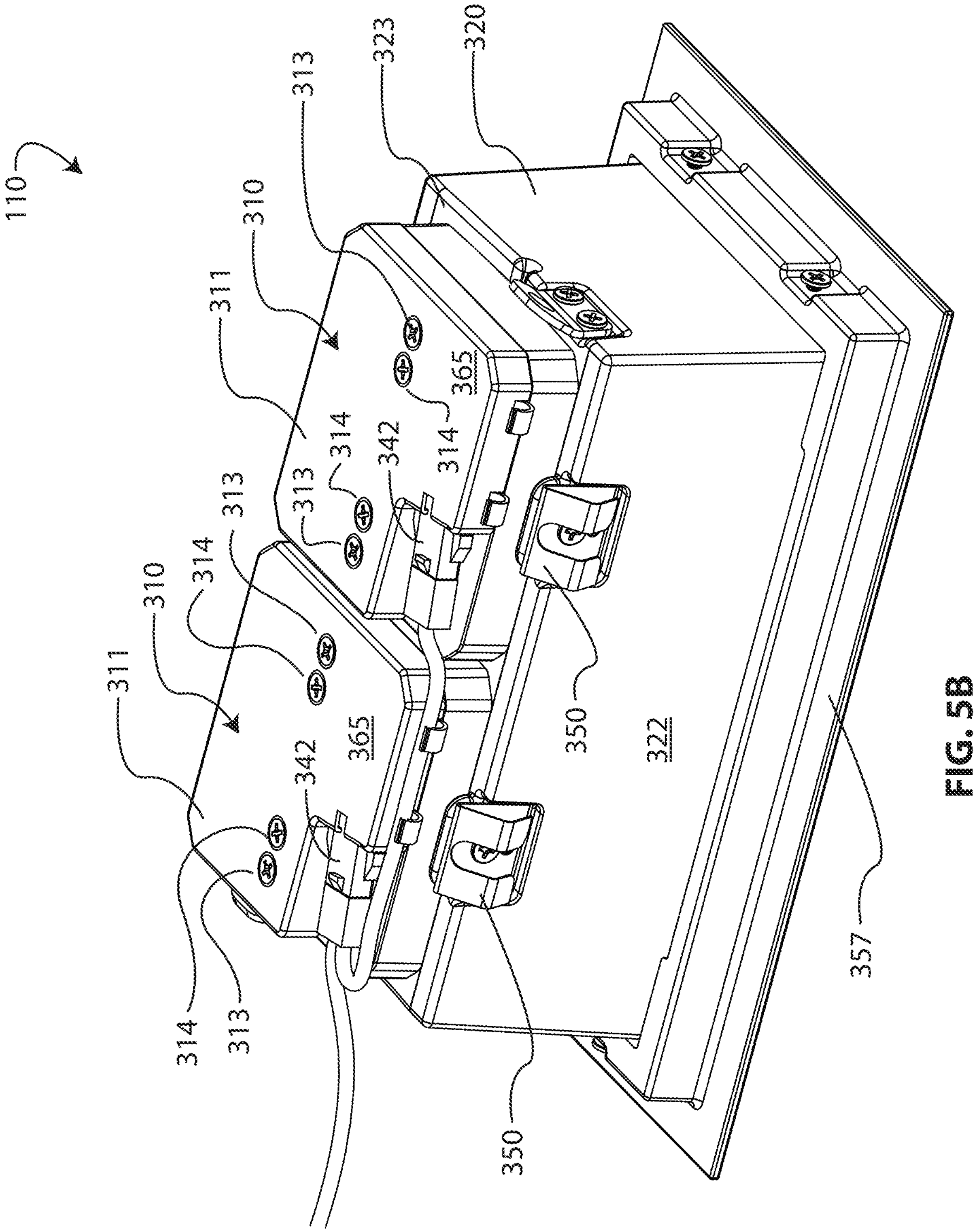
FIG. 5B is a back perspective view of an example of the optic assembly, according to various embodiments.
Figure 5C:
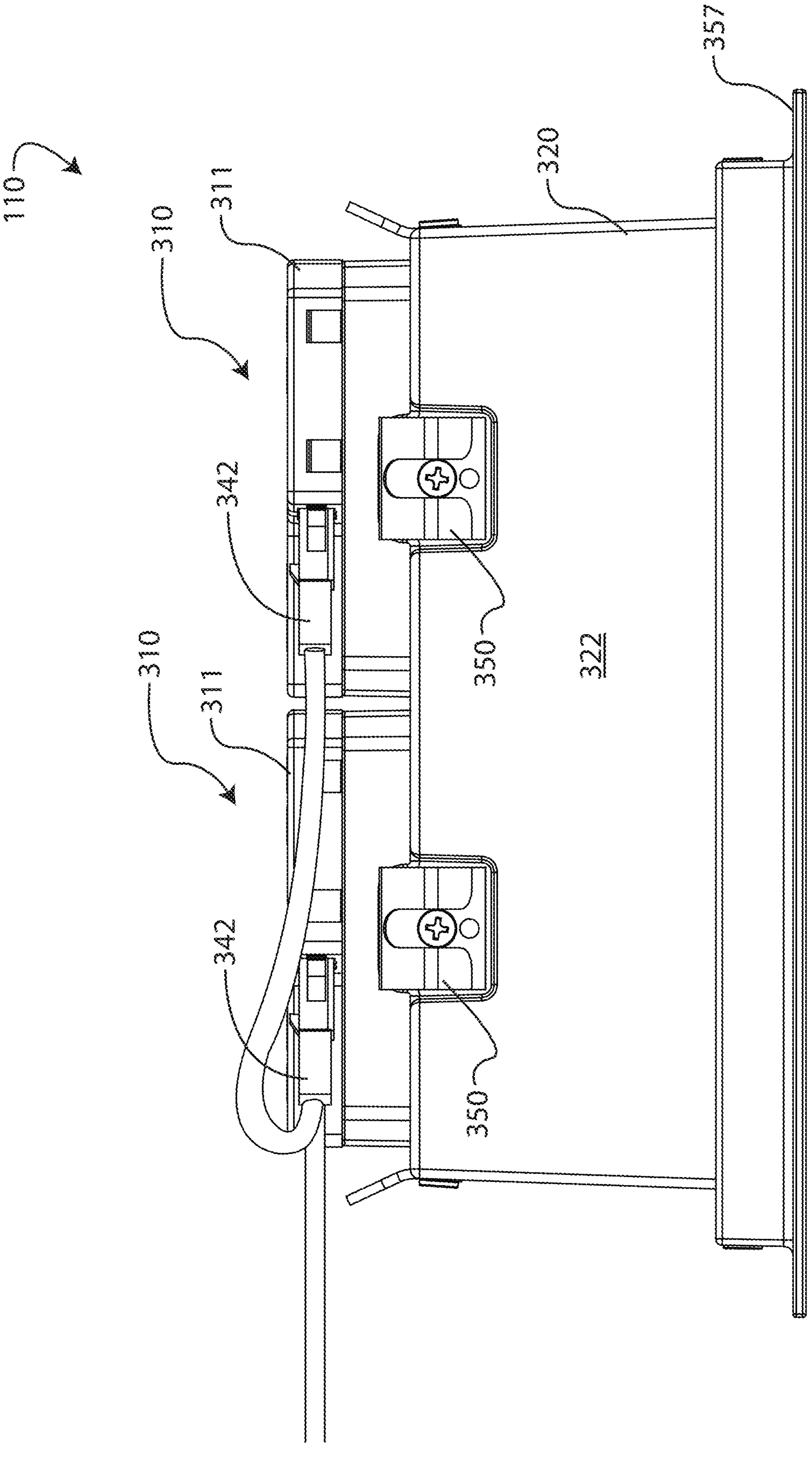
FIGS. 5C and 5D are side views of an example of the optic assembly, according to various embodiments.
Figure 5D:
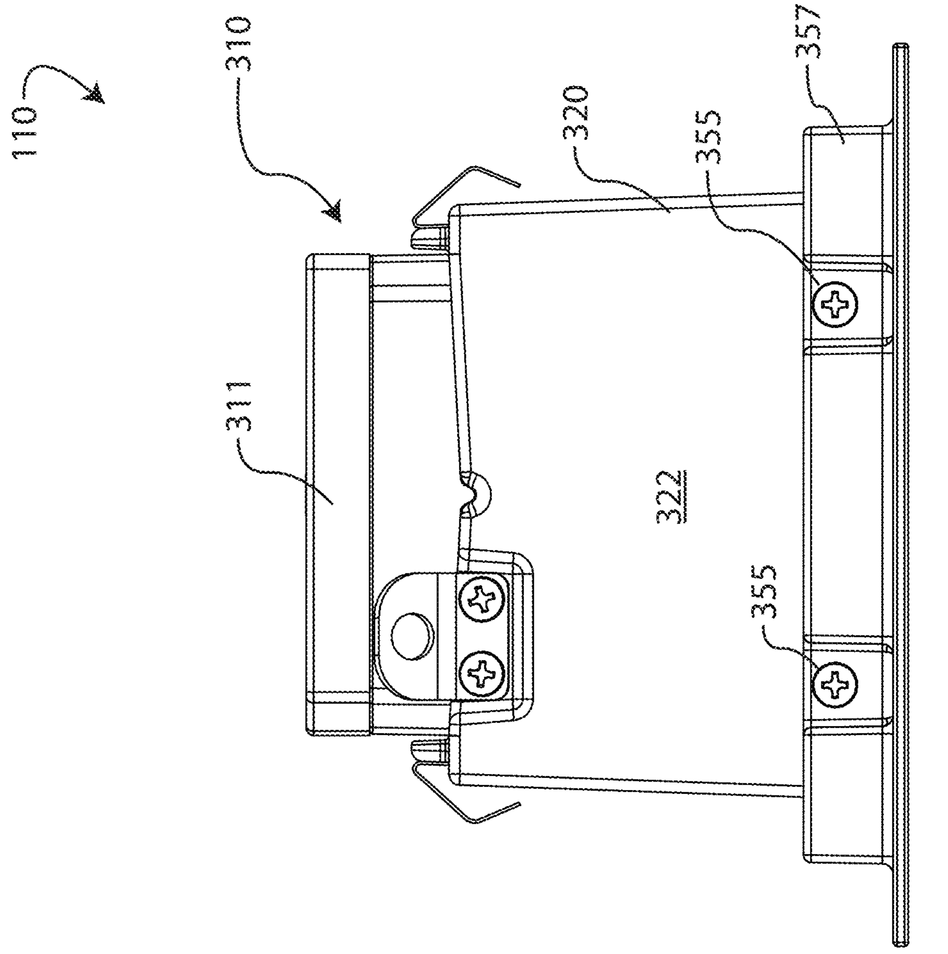
Figure 5E:
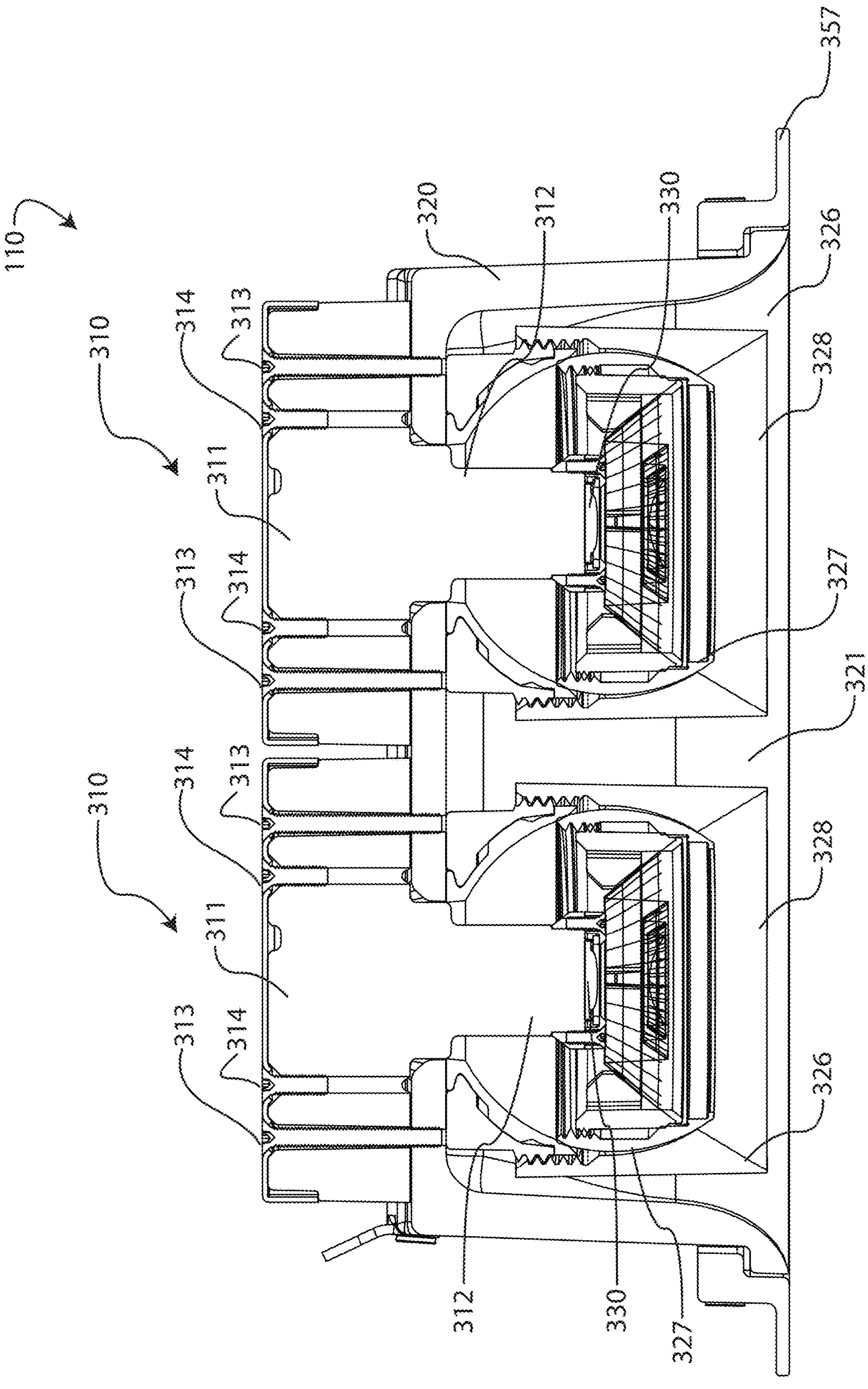
FIG. 5E is a cross-sectional view of an example of the optic assembly, according to various embodiments.
Figure 5F:
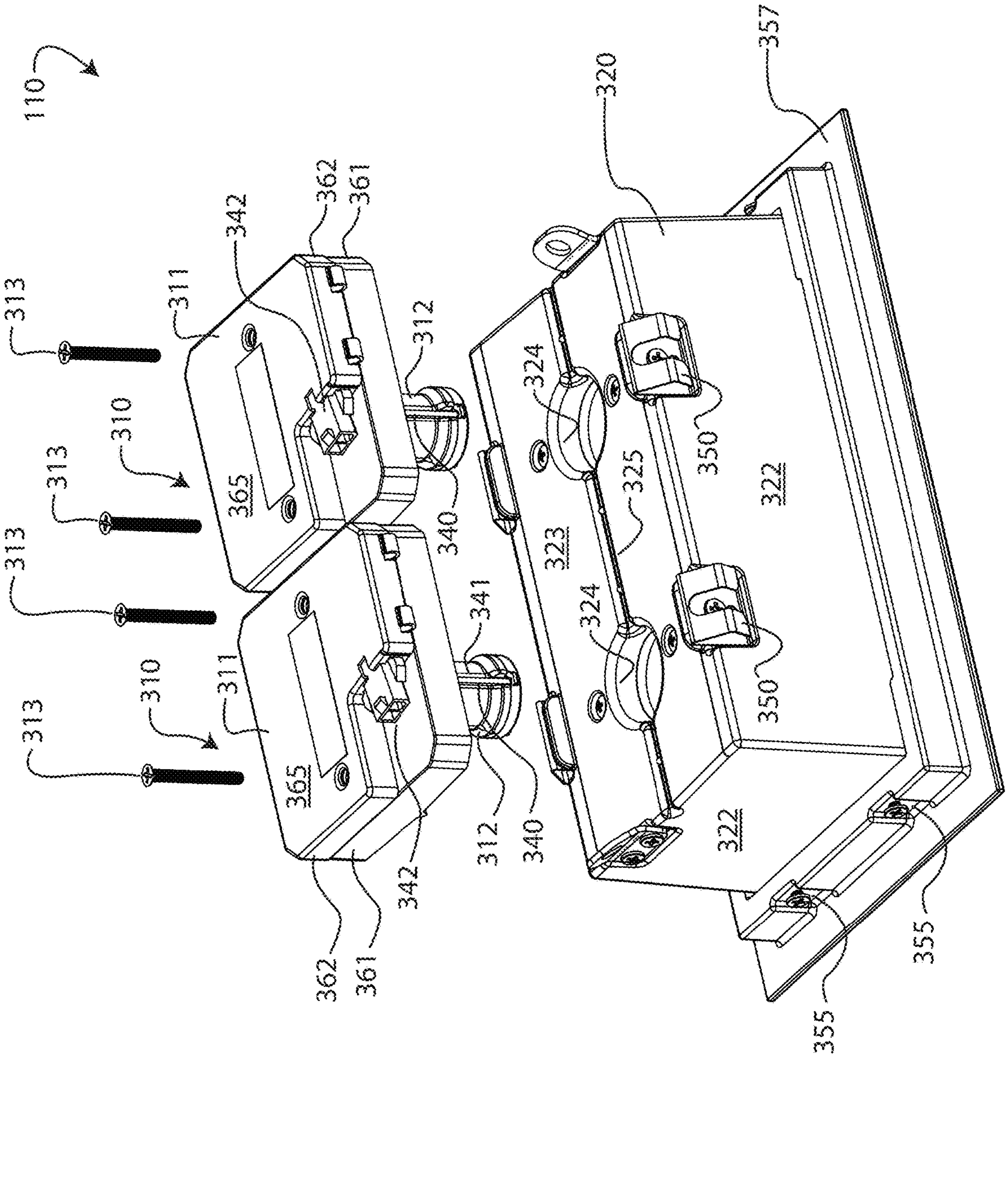
FIG. 5F an exploded view of an example of the optic assembly, according to various embodiments.

FIG. 5A is a front perspective view of an example of the optic assembly 110, according to various embodiments. FIG. 5B is a back perspective view of an example of the optic assembly 110, according to various embodiments. FIGS. 5C and 5D are side views of an example of the optic assembly 110, according to various embodiments. FIG. 5E is a cross-sectional view of an example of the optic assembly 110, according to various embodiments. FIG. 5F an exploded view of an example of the optic assembly 110, according to various embodiments.

Figure 6A:
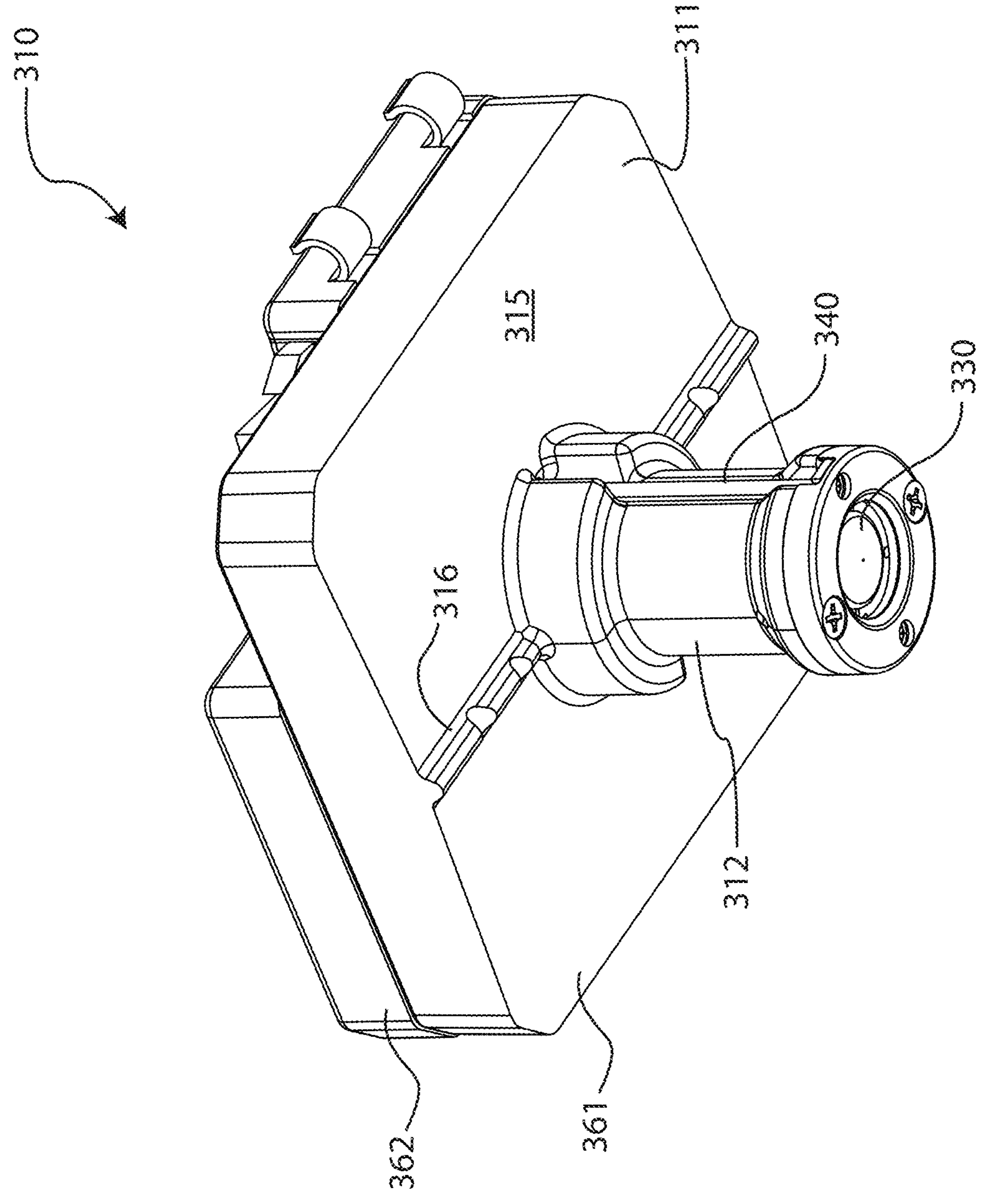
FIG. 6A is a front perspective view of an example of a light module of the optic assembly, according to various embodiments.
Figure 6B:
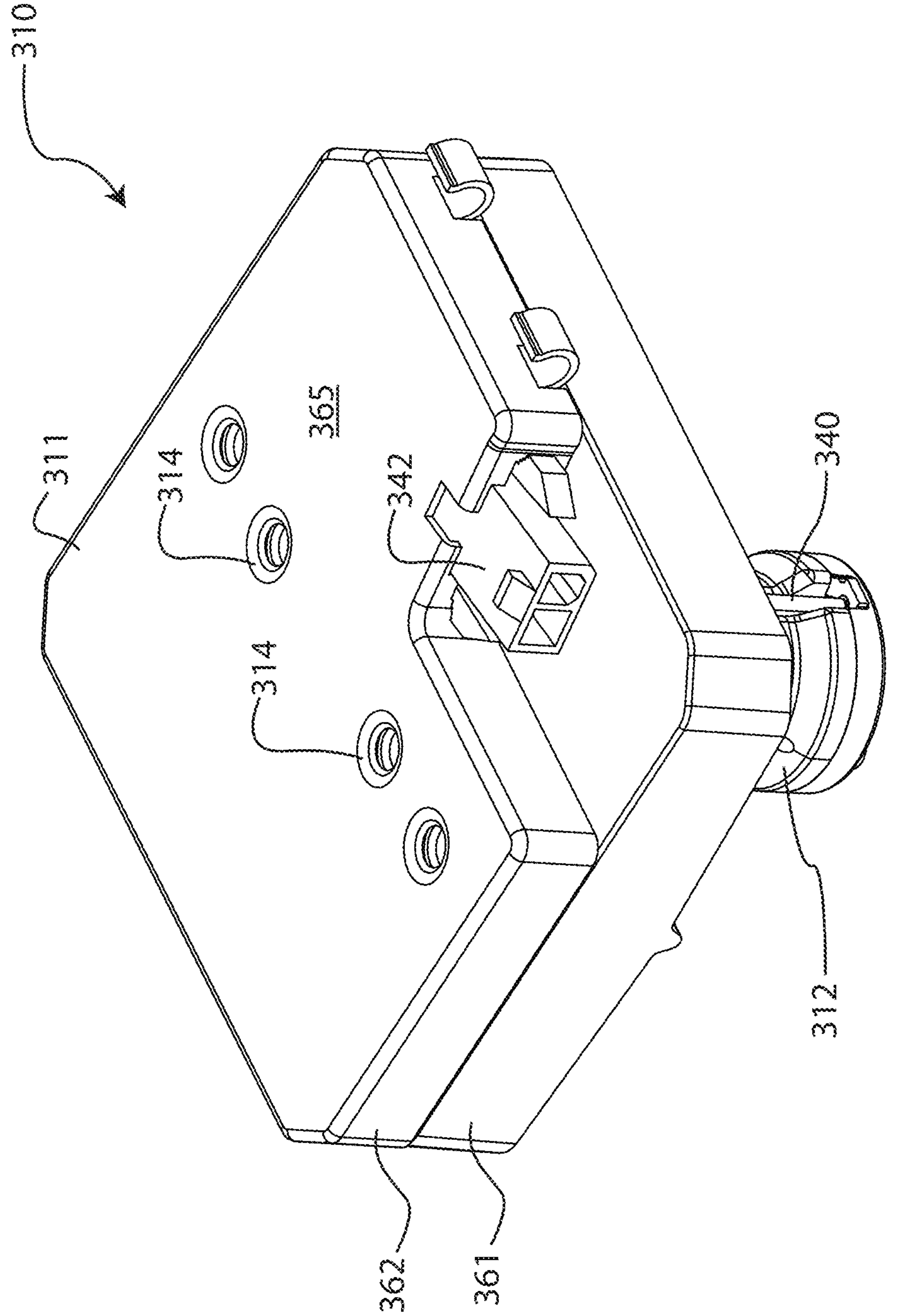
FIG. 6B is a back perspective view of an example of the light module, according to various embodiments.
Figure 6C:
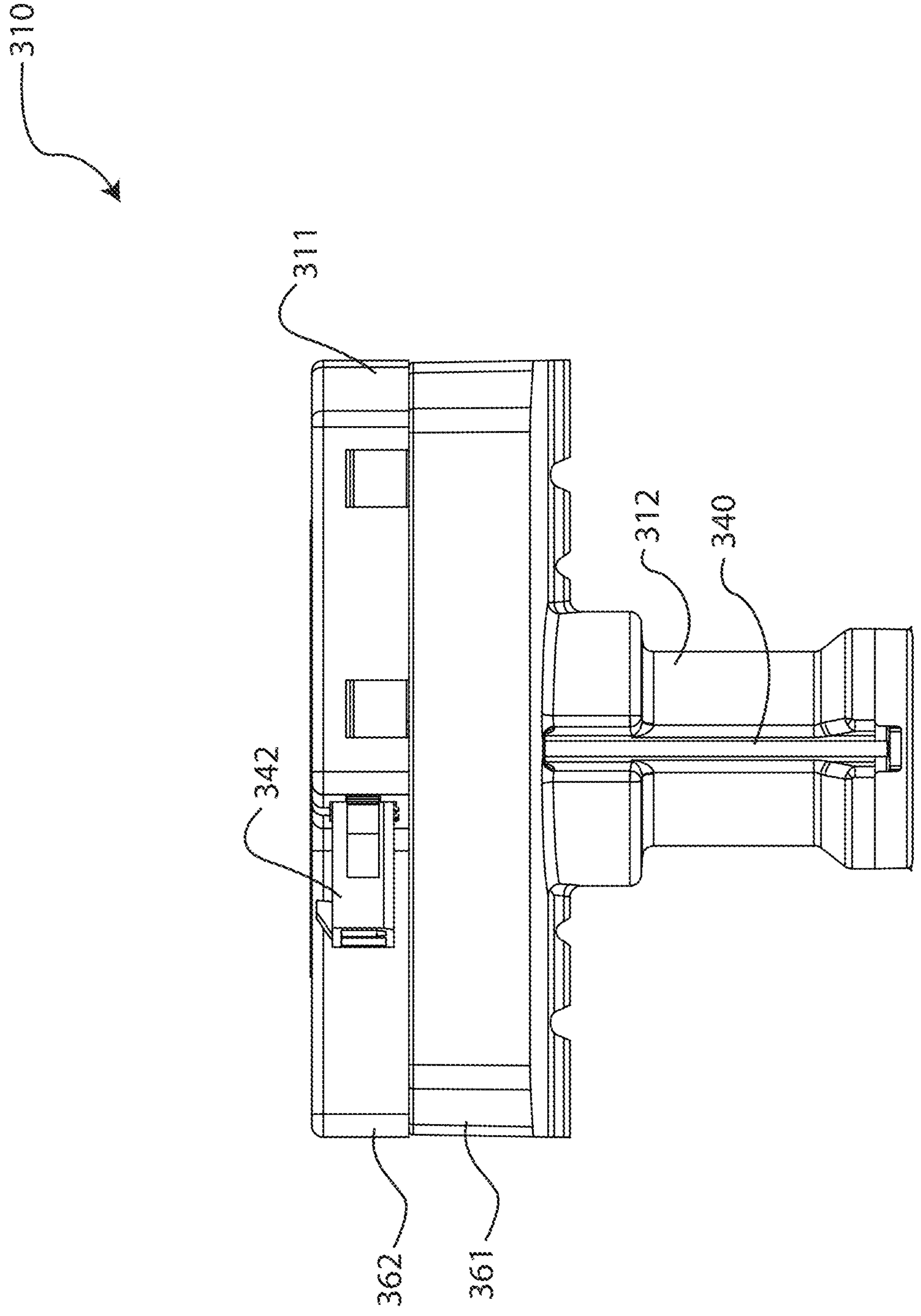
FIGS. 6C and 6D are side views of an example of the light module 310, according to various embodiments.
Figure 6D:
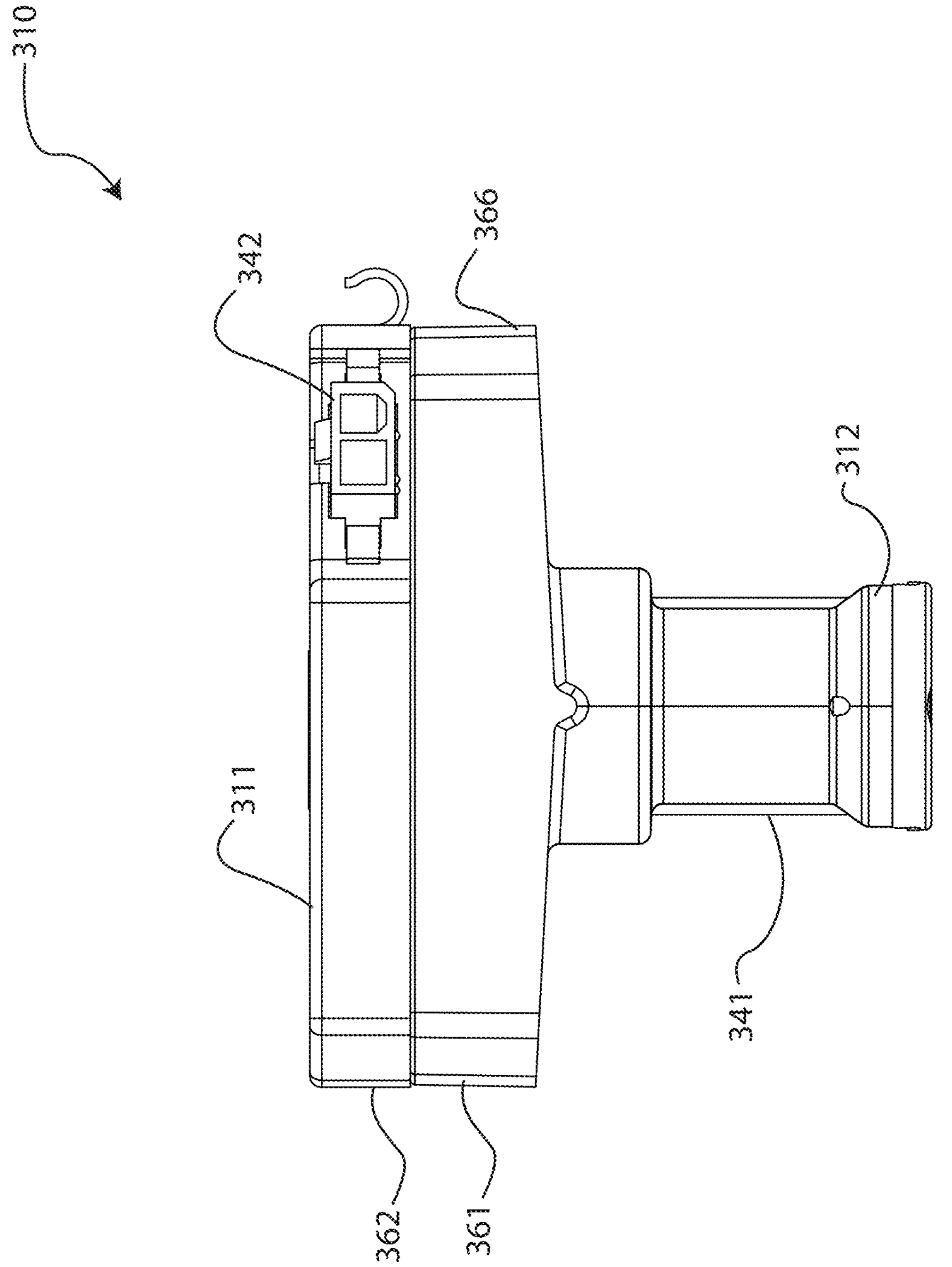
Figure 6E:
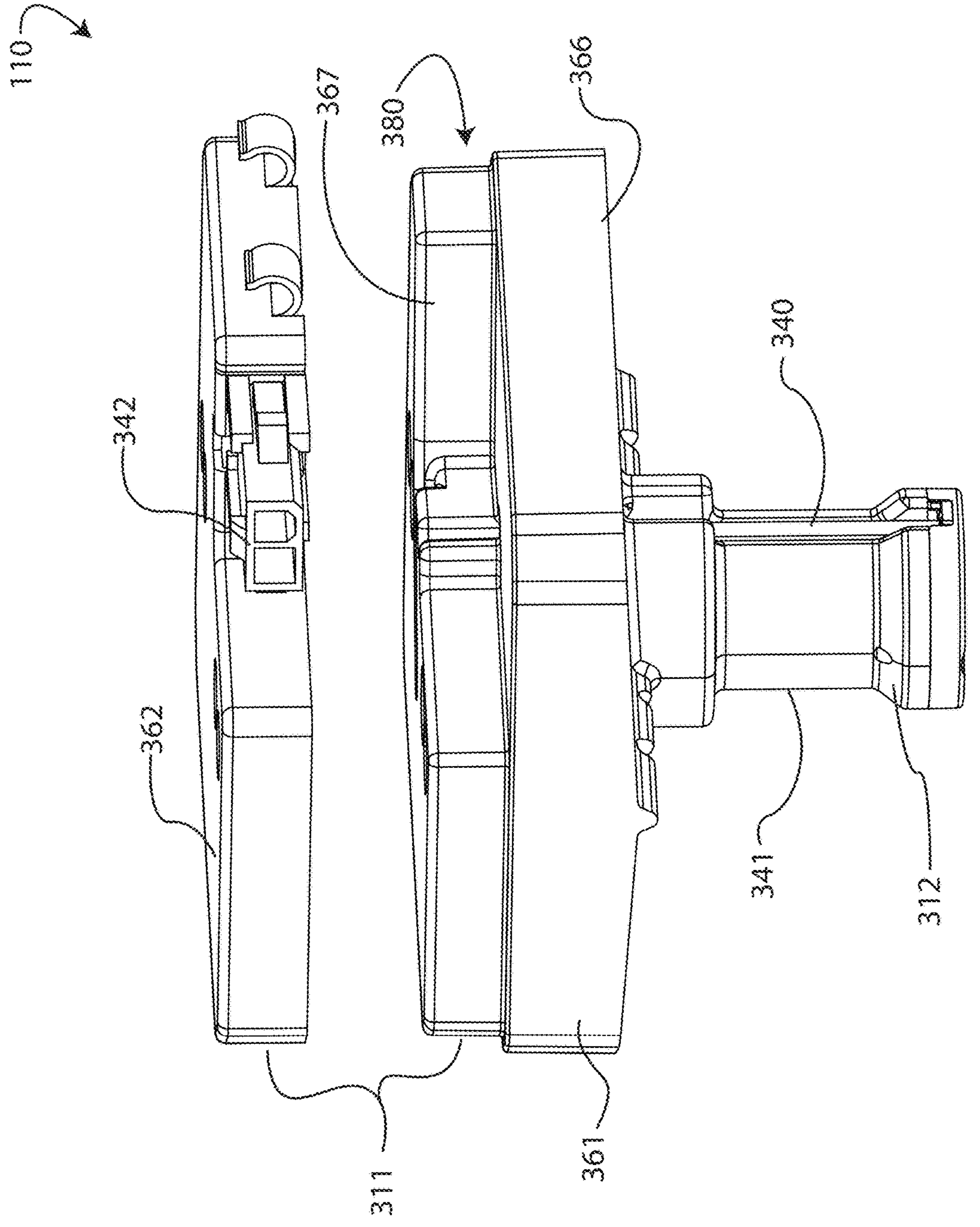
FIG. 6E is a view of an example of the light module with a front portion of the base portion of a light module separated from a back portion of the base portion of a light module 310, according to various embodiments.
Figure 6F:
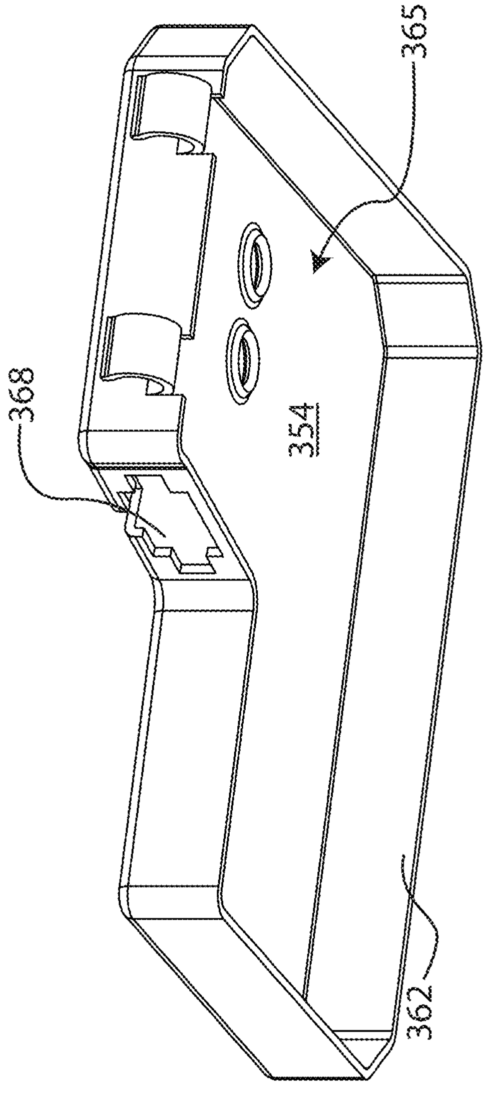
FIG. 6F is a view of a back portion of the base portion of a light module, according to various embodiments.
Figure 6G:
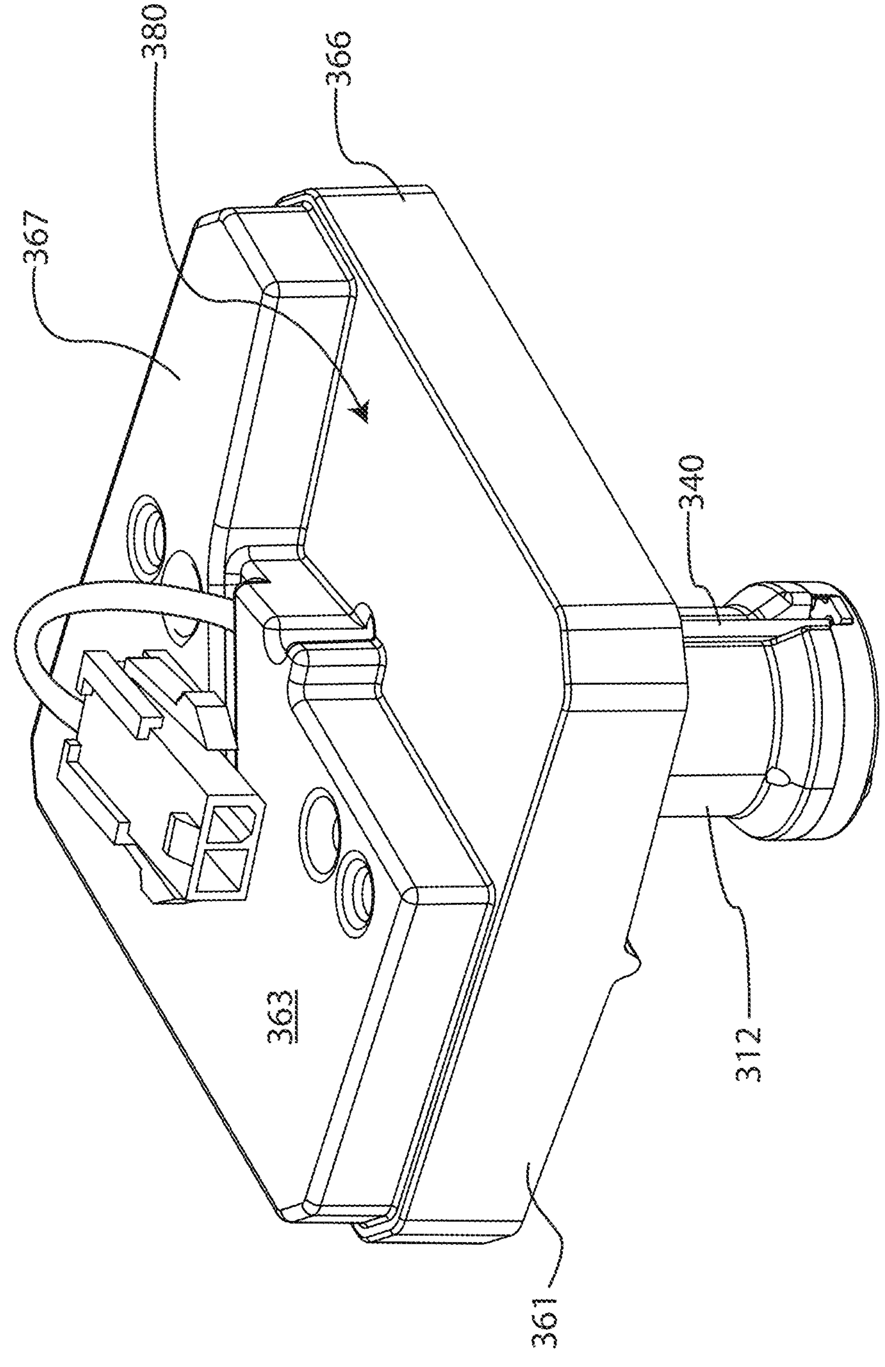
FIG. 6G is a view of a front portion of the base portion of a light module, according to various embodiments.

FIG. 6A is a front perspective view of an example of a light module 310 of the optic assembly 110, according to various embodiments. FIG. 6B is a back perspective view of an example of the light module 310, according to various embodiments. FIGS. 6C and 6D are side views of an example of the light module 310, according to various embodiments. FIG. 6E is a view of an example of the light module 310 with a front portion 361 of the base portion 311 of a light module 310 separated from a back portion 362 of the base portion 311 of a light module 310, according to various embodiments. FIG. 6F is a view of a back portion 362 of the base portion 311 of a light module 310, according to various embodiments. FIG. 6G is a view of a front portion 361 of the base portion 311 of a light module 310, according to various embodiments.

The optic assembly 110 includes one or more light modules 310 and a light housing 320. In some examples, the optic assembly 110 provides a good (relatively high or fast rate) of thermal communication for thermal transfer and dissipation of heat from a light source of each light module 310 to the rest of the light module 310 and the light housing 320, where the light module 310 and the light housing 320 function as a heat sink when the optic assembly 110 is installed in the lighting device assembly 100. In some examples, the optic assembly 110 is configured to be selectively installed in and received by (or removed from) the rest of the lighting device assembly 100 (e.g., at the collar 210), while the rest of lighting device assembly 100 is in a mounted state in or on the ceiling, wall, or another structure via the brackets 130*a* and 130*b*.

The light housing 320 (e.g., a module housing) defines a receptacle 321 (e.g., an interior volume) that contains and supports other components of the optic assembly 110 such as at least a portion of the light modules 310. While the light housing 320 is shown to contain and support two light modules 310, the light housing 320 can be shaped and sized to house and support any number (e.g., one or three or more) of light modules 310.

The light housing 320 includes lateral sides 322 and a back side 323. The lateral sides 322 and the back side 323 define and face the receptacle 321. The back side 323 includes one or more holes 324, each of which is configured to receive a respective one of the one or more light modules 310. The light module 310 includes a base portion 311 and a holder portion 312. The holder portion 312 is a module with a light source 330 (e.g., the holder portion 312 contains and supports a light source 330).

The holder portion 312 extends through a hole 324 of the back side 323 into the receptacle 321. The base portion 311 is coupled to the back side 323 of the light housing 320 via one or more first fasteners 313. Examples of the first fasteners 313 include screws, pins, bolts, etc. In other examples, the first fasteners 313 can include snap clip, latch, clamp, buckle, hook, adhesives, welding, friction fitting, clamps, or other fasteners.

In some examples, one or more of the base portion 311, the holder portion 312, the light housing 320 include or function as a heat sink. Each of the base portion 311, the holder portion 312, the light housing 320 can be made of any suitably rigid material and, in particular examples, is made of a material having good (relatively high or fast rate) thermal conduction characteristics, such as, but not limited to a heat dissipating metal, plastic, ceramic or composite material, for dissipation of heat from the light source 330, a driver, and any other heat-generating component mounted on or enclosed within the housing 120. For example, heat from the light source 330 can be transferred, via conduction, to the holder portion 312 and via conduction or convection, to the housing 120. The holder portion 312 can transfer the heat, via conduction, to the base portion 311, which can transfer the heat to the housing via conduction. The base portion 311 and the light housing 320 can transfer the heat, via conduction or convection, to the housing 120, which transfers the heat to a surrounding environment (directly or via the brackets 130*a* and 130*b*), such as the plenum, attic space, wall space, or another volume space in the ceiling, wall, or another object adjacent to or contacting the housing 120 or the brackets 130*a* and 130*b*. In addition, the light housing 320 can transfer heat toward the area to which the light source 330 by convection. That is, the light housing 320 can transfer heat toward air that is in front of the lighting device assembly 100 when the lighting device assembly 100 is installed to a wall, a ceiling, or a surface in a plenum, attic space, wall space, or another volume space in the ceiling, wall, or another object.

In some examples, at least a portion of a front surface 315 of the base portion 311 directly contacts the back side 323 of the light housing 320. By having the portion of the front surface 315 of the base portion 311 directly contacting the back side 323 of the light housing 320, heat can transfer from base portion 311 to the light housing 320 by conduction, thus improving the efficiency by which heat is transferred from base portion 311 (and from the light source 330) to the light housing 320. In some examples, given that the rate of heat transfer depends on the area of the direct contact, an entirety of the front surface 315 of the base portion 311 directly contacts the back side 323 of the light housing 320.

In some examples, the back side 323 of the light housing 320 include a groove 325. The front surface 315 of the base portion 311 includes a ridge 316 having a convex shape that conforms to the concave shape of the groove 325. The ridge 316 is configured to be received in (e.g., checked in, indexed, or aligned to) the groove 325 when the front surface 315 of the base portion 311 is coupled to the back side 323 of the light housing 320. The ridge-and-groove configuration allows easy placement and installation of the light module 310 by a user. For example, after the user inserts the holder portion 312 of a light module 310 through a hole 324, the user would lose view of the portion of the back side 323 of the light housing 320, thus cannot orient the light module 310 appropriately to align with any threaded holes of the light housing 320 configured to receive the first fasteners 313 for securing the base portion 311 to the back side. The implementation of the groove 325 and the ridge 316 allows the user to orient (e.g., rotate) the base portion 311 after the holder portion 312 is inserted into the hole 324 until the ridge 316 is received and fits into the groove 325. In the position in which the ridge 316 is received and fits into the groove 325, the holes in the base portion 311 that receive the first fasteners 313 align with the holes 325, to allow the first fasteners 313 to fasten to the holes 325. In some examples, the groove 325 and the ridge 316 extend along a horizontal axis.

In some examples, the base portion 311 is a heat spreader or a heat sink, and has a generally square cuboid shape, a slab shape, a flat shape, and so on. The holder portion 312 has a generally cylindrical shape and protrudes from the front surface 315 of the base portion 311. In some examples, the slab shape of the base portion 311 (e.g., the front surface 315) and the height of the cylindrical shape (along the vertical axis) of the holder portion 312 form a right angle. The shape and size of the base portion 311 allow a user to grasp the light module 310 by the base portion 311 with one hand. For example, the size of the base portion is approximately the size of a normal person's hand. Such shape and size of the light module 310 allow easy and fast installation of the light module 310 to the light housing 320. Other suitable shapes of base portion 311 and the holder portion 312 can be likewise implemented.

In some examples, the light source 330 is located at or adjacent to a first end of the cylindrical shape of the holder portion 312. A second end of the cylindrical shape of the holder portion 312 is connected to the base portion 311. The light source 330 can include any suitable light emitting device or devices. In some examples, each light source 330 includes one or more LEDs or other light source that generates heat during operation. While particular examples described herein include at least one light source 330 having one or more LEDs, other examples of the light source can include other suitable light sources such as halogen, halide, fluorescent, or incandescent light sources, other electrical discharge or electroluminescence device, and so on. In some examples, the light source 330 can be mounted on a circuit board or other support structure, which can be enclosed by the base portion 311, the holder portion 312, or by a driver. In some examples, the light source 330 is fixed to and mounted in thermal communication with (e.g., directly contacting through conduction or through convection over a gap) the mounting surface of a heat sink (e.g., the holder portion 312, as shown in for example FIG. 5E) for the heat sink to efficiently receive and conduct heat from the light source 330. By dissipating heat away from the light source 330, the efficiency and light output of the light source 330 can significantly improve. In that regard, in some examples, the holder portion 312 can include a solid or a mostly solid (instead of a hollow) interior.

One or more wires 340 and 341 connect the light source 330 to a connector 342 of the light module 310. The connector 342 connects the wires 340 and 341 on one end and connects cables to a driver and/or a power source on the other end. In other words, the connector 342, the wires 340 and 341, and the cable connects the light source 330 to the driver and/or power source. At least a portion of each of the wire wires 340 and 341 is external to the holder portion 312. For example, the holder portion 312 can include a groove extending along a vertical axis along a curved external surface of the holder portion 312. At least a portion of each of the wire wires 340 and 341 is received by and fitted in the groove. In some examples, a holder portion 312 can include two such grooves for receiving two wires 340 and 341. By running the wires 340 and 341 external to the holder portion 312 instead of internal to the holder portion 312, the holder portion 312 can remain entirely solid or mostly solid, which improves heat transfer from the light source 330 to the base portion 311 by conduction. The wires 340 and 341 can extend through an internal space of the base portion 311.

For example, the base portion 311 includes a front portion 361 and a back portion 362. The front portion 361 includes the front surface 315 of the base portion 311 and a back surface 363 facing the back portion 362. The front portion 361 includes a first portion 366 and a second portion 367. The first portion 366 includes the front surface 315 of the base portion 311. The second portion 367 includes the back surface 363 of the front portion 361 facing the back portion 362. The back portion 362 includes a front surface 364 facing the front portion 361 (e.g., facing the back surface 363 of the front portion 361) and a back surface 365 facing away from the front portion 361. At least a part of the second portion 367 is between the first portion 366 and the back portion 362. The front portion 361 and the back portion 362 are coupled via one or more second fastener 314. Examples of the second fasteners 314 include screws, pins, bolts, etc. In other examples, the second fasteners 314 can include snap clip, latch, clamp, buckle, hook, adhesives, welding, friction fitting, clamps, or other fasteners.

The back portion 362 forms a receptacle 354 to receive at least a portion of the front portion 361, including the second portion 367 and the back surface 363 of the front portion 361. As shown, the back portion 362 is configured as a cover having a suitable size and shape to encapsulate at least partially the back surface 363 and the side surfaces of the second portion 367. The back portion 362 functions as a cover to provide access to at least a portion of the wires 340 and 341 and the connector 342. A user can fasten the fasteners second fasteners 314 to couple the back portion 362 to the front portion 361 to cover and secure the wires 340 and 341 and the connector 342 in place between the front portion 361 and the back portion 361, e.g., between the back surface 363 of the front portion 361 and the front surface 364 of the back portion 362.

The base portion 311 includes at least one chamfered corner. In some examples as shown, the base portion 311 includes 4 chamfered corners, each of which is at a corner of the square or rectangular shape of the base portion 311. In some examples, each of the front portion 361, the back portion 362, the back surface 363, the front surface 364, the back surface 365, the first portion 366, and the second portion 367 includes a plurality of chamfered corners. The chamfered corners of the base portion 311 allows easy handling (e.g., grasping and placing) of the base portion 311 during the installation and removal processes of the light module 310 with respect to the light housing 320, provides additional space for accommodating the wires, cables, and connectors 342 while minimizing the spacing between the two adjacent light modules 310, without impacting the thermal transfer efficiency of the light modules 310.

The back portion 362 and the second portion 367 are coupled to at least one of the connector 342 or the wires 340 and 341 connected to the connector 342. The wires 340 and 341 are connected to the light source 330, and the wires 340 and 341 extends through at least a portion of an internal hole within the volume of at least one of the first portion 366 or the second portion 367. The second portion 367 has a chamfered corner 380. The back portion 362 includes a cavity 368 at the chamfered corner 380 of the second portion 367 to receive the connector 342. For example, the connector 342 can be inserted into and snapped or friction fitted at the cavity 368. The second portion 367 includes an external space defined by the chamfered corner 380 and a part of the first portion 366. For example, the external space refers to the space cutout from a would-be portion of the second portion 367 if the second portion 367 has a similar shape and size as that of the first portion 366, to form the chamfered corner 380. The chamfered corner 380 has a size greater than the other chamfered corners of the base portion 311, such as those for the first portion 366. The at least one of the connector 342 or the wires 340 and 341 is arranged in the external space of the chamfered corner 380 when at least one of the connector 342 or the wires 340 and 341 is coupled to the back portion 362 through the cavity 368. This allows the at least one of the connector 342 or the wires 340 and 341 to not protrude beyond the profiles (e.g., the back surface 365), the lateral sides of the base portion 311 (e.g., the lateral sides of the portions 361 and 362), or the chamfered corners of the base portion 311 (e.g., the chamfered corners of the portions 361 and 362). Such configuration allows the light modules 310 to have an overall simplistic shape for handling without impacting the thermal transfer efficiency of the light modules 310. For example, by providing the light modules 310 and the light housing 320 in the manner of described, a user can easily and efficiently install the light module 310 to the light housing 320 and connect the wires and cables using the connectors 342.

In some examples, the front portion 361 is composed of a single, unitary body of such material, for improved heat dissipating capabilities. In some examples, the body of the front portion 361 is made of a generally solid, unitary piece of material that is configured as described herein. In some examples, the front portion 361 and the holder portion 312 are composed of a single, unitary body of such material, for improved heat dissipating capabilities. In some examples, the body of the front portion 361 and the holder portion 312 is made of a generally solid, unitary piece of material that is configured as described herein. In some examples, the body of the light module 310 can be made by any suitable manufacturing process or processes including, but not limited to molding, machining, extrusion, or combinations thereof. The light module 310 can be made of any suitably rigid material or materials including, but not limited to metal, plastic, ceramic, composite material, or combinations thereof. In particular examples, the light module 310 is made of a material having a good (relatively high or fast rate) of thermal dissipation capabilities such as, but not limited to a heat dissipating metal, plastic, ceramic or composite material.

The light housing 320 includes at least one attachment member 350 in at least one of the lateral sides 322 configured to couple the light housing 320 to a collar 210 of the lighting device assembly 110 by friction fitting to a surface (e.g., an interior surface) of the collar 210. In some examples, an attachment member 350 includes a spring clip, a guide, a spring, or a friction member. For example, an attachment member 350, which has a cantilevered clip shape with a bulge, bends when the inner surfaces of the sides 211*c* and 211*d* of the collar 210 comes in contact with the bulge portion of the attachment member 350, and the resulting spring force exerts friction force onto the inner surfaces of the sides 211*c* and 211*d* of the collar 210.

When installing the light device assembly 110 into the collar 210, a user inserts the light device assembly 110 into the collar 210 and the cavity 124 through the opening 125 such that the attachment members 350 move from front edges of the collar 210 to the back edges of the collar 210 (e.g., from front edges of the sides 211*c* and 211*d* to the back edges of the sides 211*c* and 211*d*), along the vertical axis (in the back direction), exerting friction force as described along the way. When the attachment members 350 are pushed past the back edges of the sides 211*c* and 211*d*, a large portion of the lighting device assembly 110, including the base portion 311 and at least a portion of the holder portion 312, is received in the cavity 124, the bulge portions of the attachment members 350 no longer deform due to the lack of contact with the sides 211*c* and 211*d* and expand. The attachment members 350 would then abut or sit on the back edges of the sides 211*c* and 211*d* due to gravity and providing resistance for the lighting device assembly 110 to move in the front direction due to gravity.

A user can pull the lighting device assembly 110 from the cavity 124 in a removal process by pulling lighting device assembly 110 (e.g., the light housing 320) from the housing 120 in the front direction. In the removal process, the attachment member 350 bends when the inner surfaces of the sides 211*c* and 211*d* of the collar 210 comes in contact with the bulge portion of the attachment member 350, and the resulting spring force exerts friction force onto the inner surfaces of the sides 211*c* and 211*d* of the collar 210. In other example, the attachment member 350 includes a snap clip, latch, clamp, buckle, hook, and so on.

The light housing 320 includes one or more recesses 355 each configured to engage a respective one of the at least one protruding member 261 and 262 of the collar 210. As shown, an attachment member 350 is provided on a first side of the lateral sides 322 and a recess 355 is provided on a second side of the lateral sides 322, where the first side is different from the second side. In some examples, at least one recess 355 is provided on one second side of the lateral sides 322, and at least one recess 355 is provided on another second side of the lateral sides 322, where the two second sides are opposite sides of the light housing 320. In some examples, the first side of the lateral sides 322 which has at least one attachment member 350 does not have any recess 355, and the second side of the lateral sides 322 which has at least one recess 355 does not have any attachment member 350. When installing the light device assembly 110 into the collar 210, a user inserts the light device assembly 110 into the collar 210 and the cavity 124 through the opening 125 such that the protruding members 261 and 262 move from the back edge of the second side of the lateral sides 322 toward the front edge of the second side of the lateral sides, along the vertical axis (in the front direction), exerting friction force onto the second side of the lateral sides 322 as described along the way. Each recess 355 functions as a stopper for holding and locking a protruding member 261 or 262 in place when the protruding member reaches the front end of the side 322. Thus, the recesses 355 are located at or adjacent to the front end of at least one lateral side 322.

In some examples, the light housing 320 includes a trim member 357. The trim member 357 may be configured to provide one or more functions including, but not limited to aesthetic or ornamental functions, heat dissipation functions, or combinations thereof. The recesses 355 can be arranged in the trim member 357, which is located at or around the front end of the lateral sides 322. The trim member 357 may include a portion for connection to the light housing 320 and a second portion that forms a flange or lip around and adjacent the light outlet opening of the light housing 320. When the light device assembly 110 is installed in the system 100 and mounted in a ceiling, wall, surface, or another structure, the flange or lip portion of the trim member 357 can be exposed relative to the exposed surface of a ceiling, wall, outer housing, or another object) of the ceiling, wall, or another structure.

In some examples, the flange or lip portion is configured to cover (and hide from view) a space or gap at the outer circumference of the lateral sides 322 of the light housing 320 and the openings in the mounting surface that may otherwise be visible. Additionally or alternatively, the flange or lip portion can be configured with an ornamental or aesthetic design or an appearance that corresponds to and matches the appearance of the mounting surface to be visually obscure. When installed, the trim member 357 (or the flange or lip of the trim member 357) may fit flush with or abutted against the mounting surface.

In some examples, an orientation of the light source 330 is configured to adjustable by pivoting the light source 330 within the optic assembly 110. In some examples, the light housing 320 can include a bezel 326 within the receptable 321. While the bezel 326 is generally has a cylindrical shape, other embodiments may include bezel 326 having other suitable shapes, including but not limited to curved or partially spherical shapes, conical, cube or cuboid shapes, rectangular shapes, triangular shapes, or the like.

A rotating member 327 can pivot and/or rotate within the bezel 326 to adjust a direction of emitted light from the light source 330, which remains fixed relative to the bezel 326 when the optic assembly 110 is installed in the light housing 320. The rotating member 327 includes an optic member 328 can be a lens, filter, or other optical device that passes light, and affects a characteristic of the light being passed. In some examples, the optic member 328 includes a lens configured to focus light toward one or more focus points or centers of focus. In some examples, the optic member 328 may have a configuration for directing light through a relatively small aperture or opening. Some examples of such optic members that can be employed for optic member 328 are described in the Applicant's U.S. Pat. No. 10,900,654 (which is incorporated herein by reference, in its entirety). In other examples, the optic member 328 may include other suitable lens configurations. The optic member 328 is configured to be pivot and/or rotate with the rotating member 327.

In some examples, an outer surface of the rotating member 327 can slideably engage a cavity (with a corresponding mating curvature and dimension) of the bezel 326 in a ball and socket manner. Accordingly, in various examples, the rotating member 327 including the optic member 328 can pivot in any direction (e.g., on a 360 degree plane) within the bezel 326, by slideably engaging the cavity of the bezel 326. Thus, the outer surface of the rotating member 327 has a curvature (e.g., upper hemisphere portion) that is partially held within the cavity of the bezel 326.

In some embodiments, at least one of the outer surface of the rotating member 327 or an interior surface of the cavity of the bezel 326 may include a friction member or a friction material coating to provide a friction surface to maintain a pivoted position of the rotating member 327 within the bezel 326. For example, when the optic member 328 is pressed and pivoted to a desired position relative to the bezel 326 and then released, the elastic member presses the rotating member 327 against the interior surface of the cavity of the bezel 326, or vice versa, so that the engaging surfaces thereof frictionally engages the friction surface, to prevent or substantially prevent the rotating member 327 from shifting (or sliding) to a different position from the desired position due to gravity (i.e., without manual force) or due to the force exerted by the elastic member. In some examples, the frictional force may be overcome by manual force applied to manually adjust or move (pivot and/or rotate) the rotating member 327 (e.g., by the exposed components of the optic member 328) relative to the bezel 326. Accordingly, the friction member or the friction material coating can include any suitable material to provide the friction surface, for example, but not limited to, silicone, rubber, and/or the like. In further examples, the friction surface includes contour, roughness or other features that enhance friction.

Driver Rail Mount System 400

Figure 7A:
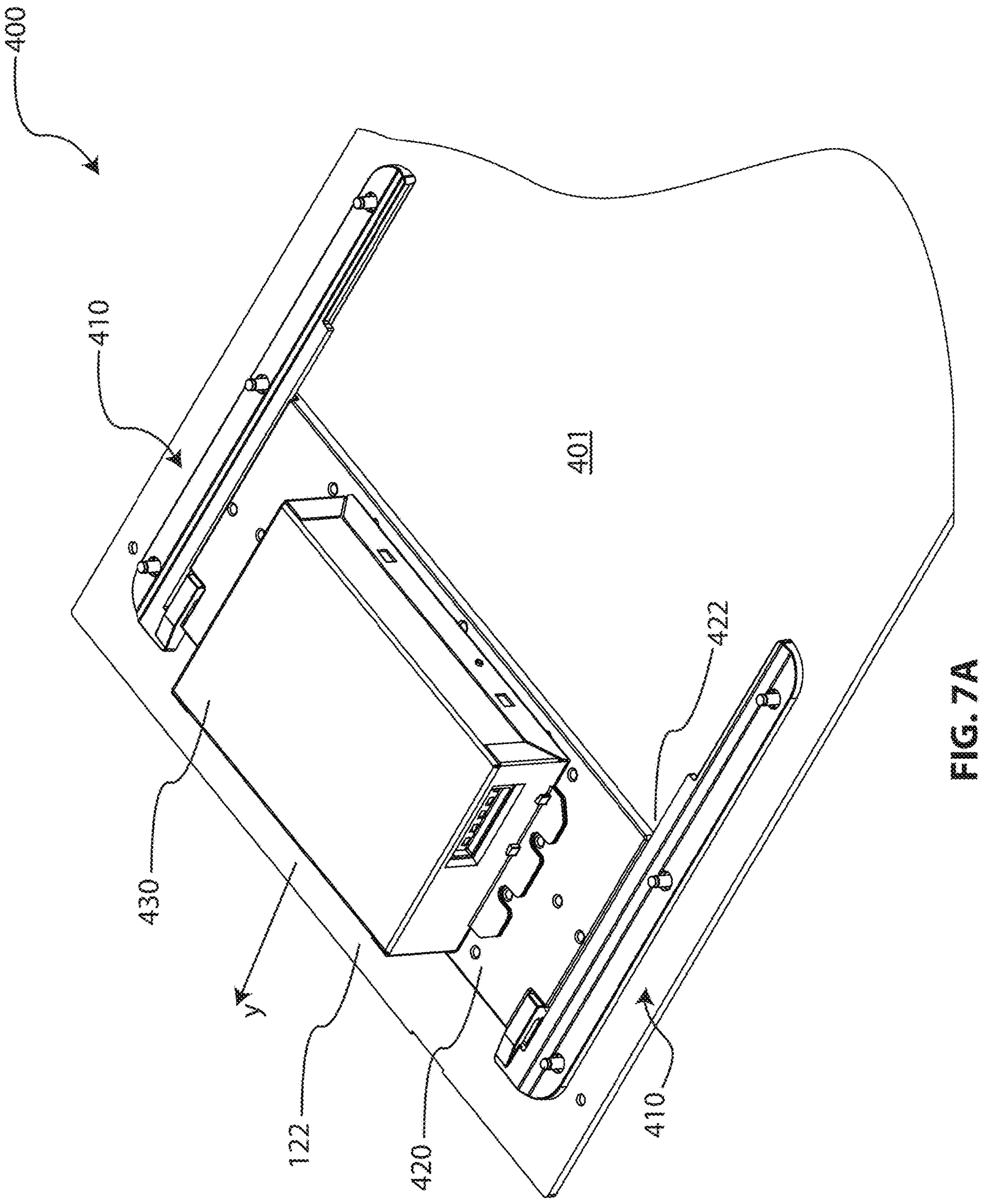
FIG. 7A is a perspective view of the back side of the housing with a rail mount system for mounting a driver, according to various embodiments.
Figure 7B:
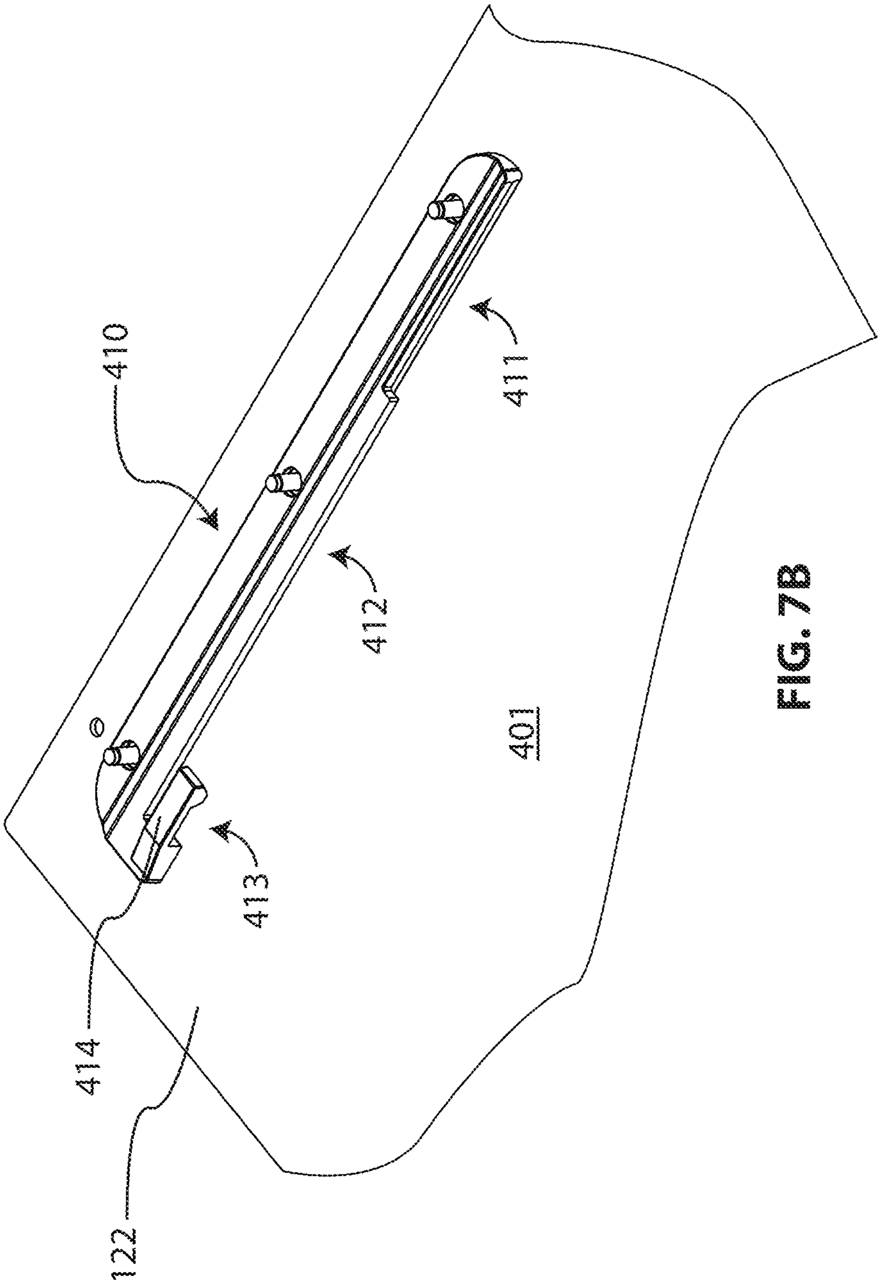
FIG. 7B is a perspective view of a rail of the rail mounting system, according to various embodiments.
Figure 7C:
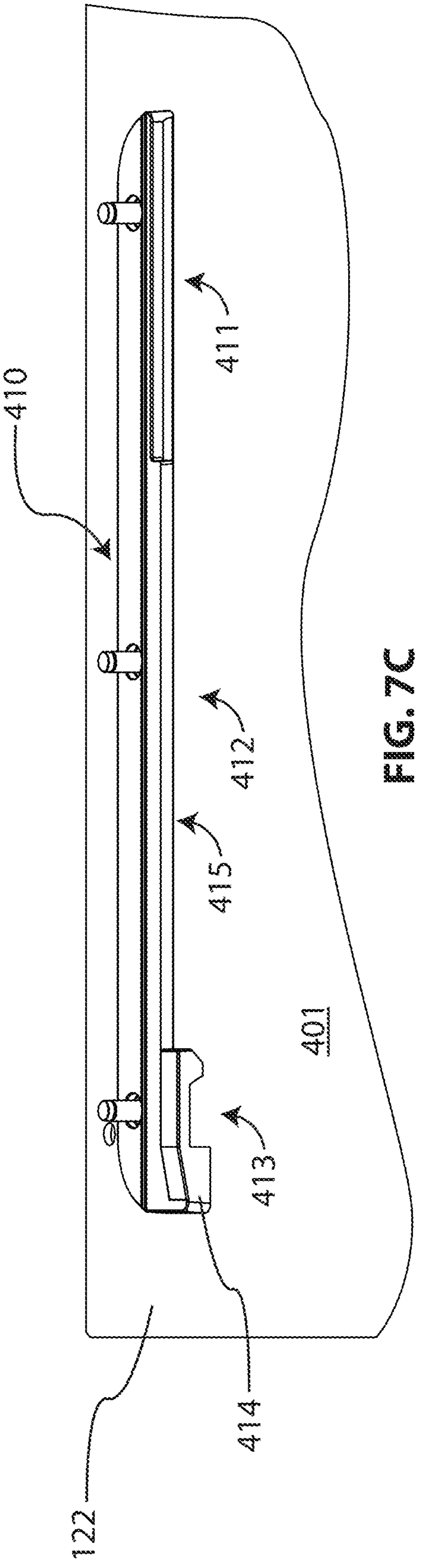
FIG. 7C is a side view of a rail of the rail mounting system, according to various embodiments.
Figure 7D:
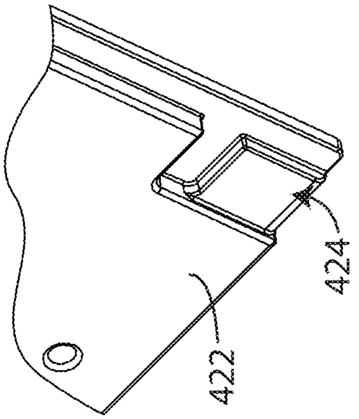
FIG. 7D is a perspective view of a side flange and a second secure member of a plate of the rail mounting system, according to various embodiments.
Figure 7E:
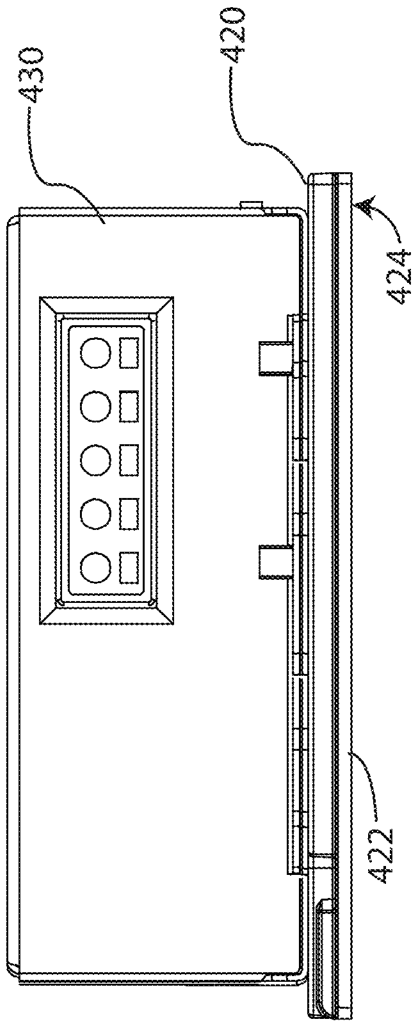
FIG. 7E is a side view of a plate of the rail mounting system, according to various embodiments.
Figure 7F:
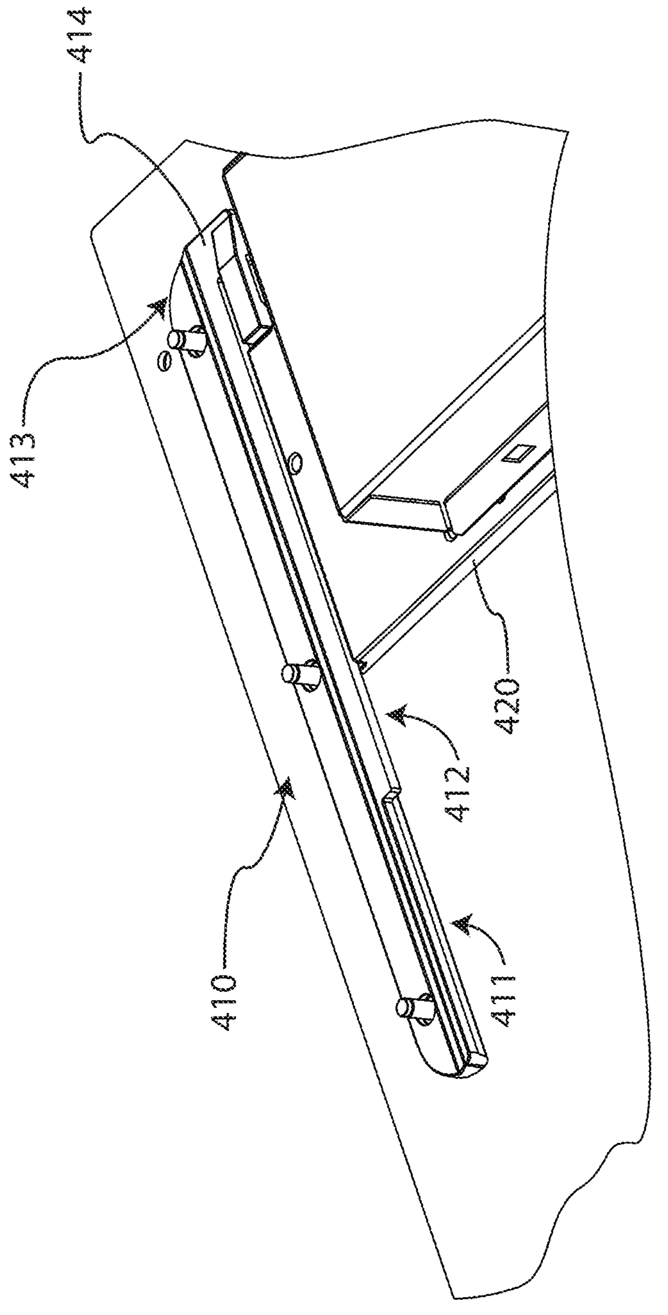
FIG. 7F is a perspective view of the rail mounting system with a first secure member secured to a second secure member, according to various embodiments.
Figure 7G:
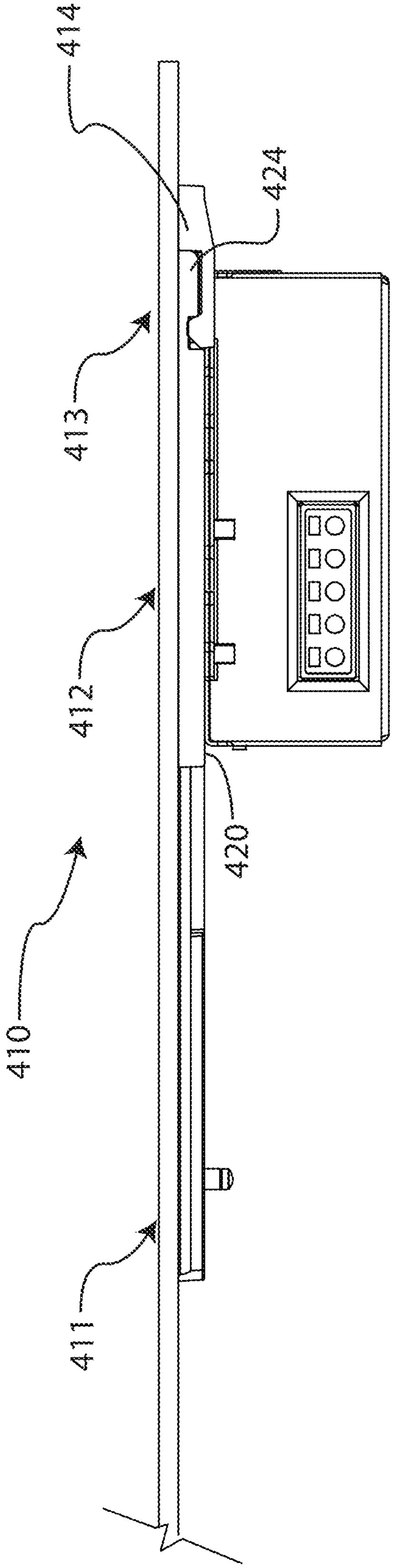
FIG. 7G is a perspective view of the rail mounting system with a first secure member secured to a second secure member, according to various embodiments.

FIG. 7A is a perspective view of the back side 122 of the housing 120 with a rail mount system 400 for mounting a driver 430, according to various embodiments. FIG. 7B is a perspective view of a rail 410 of the rail mounting system 400, according to various embodiments. FIG. 7C is a side view of a rail 410 of the rail mounting system 400, according to various embodiments. FIG. 7D is a perspective view of a side flange 422 and a second secure member 424 of a plate 420 of the rail mounting system 400, according to various embodiments. FIG. 7E is a side view of a plate 420 of the rail mounting system 400, according to various embodiments. FIG. 7F is a perspective view of the rail mounting system 400 with a first secure member 414 secured to a second secure member 424, according to various embodiments. FIG. 7G is a perspective view of the rail mounting system 400 with a first secure member 414 secured to a second secure member 424, according to various embodiments.

In some arrangements, a rail mount system 400 is operatively coupled to the back side 122 of the housing 120 for removably mounting a driver 430 configured to drive the light source 330. The driver 430 is connected to a power source (e.g., a power outlet, a battery, power line, and so on) via suitable cables. One or more cables from the driver 430 is connected to the connectors 342 for driving the light source 330. The driver 430 is configured to convert power provided by the power source to a suitable power for driving the light source 330. In some examples, the driver 430 can include a processor to execute instructions stored on memory (e.g., non-transient computer readable media) or transmitted to the processor, to process data and/or to control various functions of the lighting device (such as, but not limited to, temperature, light output, color of light, direction of light, focus of light, and/or the like). In particular examples, the light source 330 includes an LED, and the driver 430 includes one or more LED drivers to drive the LED light source 330.

The rail mount system 400 includes at least a rail 410 and a plate 420. The plate 420 is configured to support the driver 430. The driver 430 can be fastened to a front surface of the plate 420 via one or more screws, nails, pins, bolts, etc. In some examples, the plate 420 includes a plurality of holes to receive such screws, nails, and pins to secure drivers 420 of a variety of sizes and shapes to the plate 420. For example, first holes on the plate 420 can be used for securing (e.g., receiving screws, nails, pins, bolts, etc.) a driver of a size and shape, and second holes on the plate 420 can be used for securing (e.g., receiving screws, nails, pins, bolts, etc.) another driver of a different size and shape. In other examples, the driver 430 can be attached to the plate 420 via one or more of a snap clip, latch, clamp, buckle, hook, adhesives, welding, friction fitting, clamps, or other fasteners. The plate 420 is slidably coupled to a front surface 401 of the back side 122 of the housing 120. When the plate 420 and the driver 420 are coupled to the front surface 401 of the back side 122 of the housing 120, and the back side 122 is coupled to the rest of the housing 120 including the lateral sides 123, the driver 420 is within the cavity 124 and facing the optic assembly 110. For example, the driver 420 can be adjacent to the connectors 342 and the light modules 310.

In some examples, the rail 410 is coupled to the backside 122 of the housing 120, e.g., to a front surface 401 of the back side 122 of the housing. The front surface 401 of the back side 122 of the housing faces the optic assembly 110 and the light modules 310. As shown, the rail mount system 400 includes two rails 410 (e.g., a first rail and a second rail), one for each sides of the plate 420. The plate 420 includes side flanges 422 (e.g., a first side flange and a second side flange) located on each of opposing sides of the plate 420. The plate 420 is slidably coupled to the rails 420 via the side flanges 422. That is, the side flanges 422 can slide in a direction y along the rails 420 to couple the plate 420 to the back side 122.

In some examples, each rail 410 includes a lead-in portion 411, a middle portion 412, and an end portion 413. The end portion 413 includes a first secure member 414. A side flange 422 includes a second secure member 424 at an end of the side flange 422. The first secure member 414 is configured to engage with, fasten, mate, or otherwise couple the second secure member 424 when the second secure member 424 slides to the first secure member 424 from the lead-in portion 411, to the middle portion 412, and then to the end portion 413. The lead-in portion 411, middle portion 412, and end portion 413 of a rail 410 are joined by a back portion of the rail 410. The back portion of the rail 410 can affix or attach the rail 410 to the back side 122 via screws, pins, bolts, snap clip, latch, clamp, buckle, hook, adhesives, welding, friction fitting, clamps, or other fasteners.

The lead-in portion 411 is configured to initial receive a side flange 422 when a user begins to slide the plate 420 (including the second secure member 424) in the y direction toward the end portion 413. The rails 410 extend along a first direction (e.g., the y direction), and the plate 420 is configured to slide against the rail 410 in the first direction. In some examples, the rails 410 on either sides of the backside 122 are parallel to each other, and the side flanges 422 on either side of the plate 420 are parallel to each other.

The distances between two lead-in portions 411 of the two rails 420 may be wider or more open than the middle portions 412 of those rails 420, to allow the user easy access and alignment of the plate 420 to the rails 420 and the space therebetween. The middle portion 412 of each rail 410 forms a channel 415 with the back side 122 (e.g., the front surface 401 thereof) of the housing 120. The side flange 422 of the plate 420 is configured to be received in and slidably coupled to the channel 415. For example, a middle portion 412 of a rail 410 includes a ridge extending from a back portion of the rail 410. The ridge is spaced apart from the front surface 401 of the back side 122 to form the channel 415. Thus, the channel 415 is formed between the ridge and the front surface 401 of the back side 122. A side flange 422 including the second secure member 424 can slide in the channel 415 between the ridge and the back side 401, after the side flange 422 slides past the lead-in portion 411. In other words, the lead-in portions 411 of the rails 410 guide the side flanges 422 to the middle portion 412. For example, at least a portion of the lead-in portion 411 is recessed from the middle portion 412 (e.g., from the ridge).

In some examples, the height of the channel 415 (e.g., the distance between the front surface 401 of the back side 122 and the surface of the ridge facing the front surface 401) is the same as the thickness of an outer portion of the flange 422 and the second secure member 424. The ridge of the middle portion 412 (and the rest of the rail 410) can be made from a suitably rigid and yet slightly flexible material such as a certain plastic, resin, or metal such that when the flange 422 and the second secure member 424 are received in the channel 415, either sliding across or held in place, the ridge can exert a spring force to push the flange 422 and the second secure member 424 toward the front surface 401 of the back side 122, such that at least a portion of or the entirety of a surface of the plate 420 abuts or directly contacts the front surface 401 of the back side 122, for thermal transfer via conduction.

For example, a first side flange 422 is configured to slide against the first rail 410, from the lead-in portion 411 of the first rail 410 to the middle portion 412 of the first rail 410, and then to the end portion 413 of the first rail 410, to engage the second secure member 424 of the first side flange 422 to the first secure member 414 of the first rail 410. A second side flange 422 is configured to slide against the second rail 410, from the lead-in portion 411 of the second rail 410 to the middle portion 412 of the second rail 410, and then to the end portion 413 of the second rail 410, to engage the second secure member 424 of the second side flange 422 to the first secure member 414 of the second rail 410.

The end portion 413 of a rail 410 includes the first secure member 414. The first secure member 414 includes one or more of a snap clip, latch, clamp, buckle, hook, and so on. For example, as shown, the first secure member 414 can include a cantilevered snap clip. The first secure member 414 can be made from a flexible or resilient material such as plastic, resin, Acrylonitrile Butadiene Styrene (ABS), polycarbonate, unfilled nylon, polypropylene, and so on. The second secure member 424 include one or more of a depression, a hole, an indentation, and so on. The first secure member 414 and the second secure member 424 are configured to engage one another to position the plate 420 at a predetermined position on the back side 122 of the housing 120. The side flange 422 is configured to slide against the rail 410, from the lead-in portion 411 to the middle portion 412, and then to the end portion 413, to engage the second secure member 424 to the first secure member 414.

In some examples, the first secure member 414 includes a snap clip, and the second secure member 424 includes a depression configured to receive the snap clip. In some examples, engaging the first secure member 414 and the second secure member 424 includes snap fitting one of the first secure member 414 and the second secure member 424 to another one of the first secure member 414 and the second secure member 424. The snap clip includes a cantilevered hook, and the depression is configured to receive the cantilevered hook. In some examples, the second secure member 424 includes a protrusion adjacent to the depression. The cantilevered hook catches the protrusion while being received in the depression.

In some examples, when the first secure member 414 and the second secure member 424 engage one another, engaging of the first secure member 414 and the second secure member 424 pushes the plate 420 toward the front surface 401 of the back side 122 of the housing 120 and pushes the front surface 401 of the back side 122 of the housing 120 toward the plate 420, such that at least a portion of or the entirety of a surface of the plate 420 abuts or directly contacts the front surface 401 of the back side 122, for thermal transfer via conduction.

The first and second secure members 414 and 424 allow positive engagement of the plate 420 to the back side 122, and when engaged, can provide resist vibration of the plate 420 relative to the back side 122, vice versa, and can provide pressure to maintain the direct contact between the plate 420 and the front surface 401 of the back side 122 for thermal conduction. In some examples, the plate 420 can function as or includes a first heat sink, and the back side 122 of the housing 120 includes a second heat sink. The plate 420 directly contacting the back side 122 of the housing 120 allow transfer heat of the driver 430 from the first heat sink to the second heat sink by conduction.

The back side 122, the plate 420, and the components thereof can be made of any suitably rigid material and, in particular examples, can be made of a material having good (relatively high or fast rate) thermal conduction characteristics, such as, but not limited to a heat dissipating metal, plastic, ceramic or composite material, for dissipation of heat from the driver 430 and any other heat-generating component mounted on or enclosed within the housing 120. In some examples, heat from the driver 430 can be transferred, via conduction, to the plate 420, which in turn transfers the heat to the back side 122 of the housing 120, which in turn transfers the heat to the brackets **130*a* and 130*b* and the rest of the housing 120. The housing 120 and the brackets 130*a* and 130*b*** can transfer the heat to the surrounding environment by conduction or convection.

Given that the lighting device assembly 100 is installed in a plenum, attic space, wall space, or another volume space in the ceiling, wall, or another object, and air flow is very limited or even non-existent in such spaces, primary heat dissipation mechanism for the embodiment described herein relies on heat sinks (e.g., the housing 120, the brackets **130*a* and 130*b*, the light housing 320, the base portion 311, the holder portion 312, the plate 410, and so on) to transfer heat from the light module 330, the driver 430, or another heat dissipating component enclosed by the housing 120** to the surround environment.

In the drawings, the relative sizes of elements, layers, and regions can be exaggerated and/or simplified for clarity. Spatially relative terms, such as "beneath," "below," "lower," "under," "above," "upper," and the like, can be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device can be otherwise oriented (e.g., rotated 90 degrees or at other orientations) and the spatially relative descriptors used herein should be interpreted accordingly.

It will be understood that, although the terms "first," "second," "third," etc., can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," "coupled to," "secured to" or "attached to" another element or feature, it can be directly on, connected to, coupled to, secured to or attached to the other element or layer, or one or more intervening elements or layers can be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," "generally" and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" can be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing description of illustrative embodiments has been presented for purposes of illustration and of description. It is not intended to be exhaustive or limiting, and modifications and variations can be possible in light of the above teachings or can be acquired from practice of the disclosed embodiments. Various modifications and changes that come within the meaning and range of equivalency of the claims are intended to be within the scope of the invention. Thus, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A lighting device assembly, comprising:

an optic assembly comprising a light source;

a housing comprising a front side, a back side, and an opening in the front side, wherein the front side, the back side, and the opening define a cavity in which the at least a portion of the optic assembly is received, wherein the housing is configured to secure the lighting device assembly to a wall, a ceiling, or a surface;

a rail mount system coupled to the back side of the housing, the rail mount system comprises:

a rail coupled to the back side of the housing, wherein the rail comprises a lead-in portion, a middle portion, and an end portion, wherein the lead-in portion is recessed from the middle portion, the end portion comprises a first secure member;

a plate configured to support a driver configured to drive the light source, the plate comprises a side flange, wherein the middle portion of the rail forms a channel with the back side of the housing, wherein the side flange is configured to be received in and slidably coupled to the channel, wherein the side flange comprises a second secure member at an end of the side flange, and wherein the first secure member and the second secure member are configured to engage one another to position the plate at a predetermined position on the back side of the housing.

2. The lighting device assembly of claim 1, wherein the first secure member comprises a snap clip; and the second secure member comprises a depression configured to receive the snap clip.

3. The lighting device assembly of claim 2, wherein the snap clip comprises a cantilevered hook, and the depression is configured to receive the cantilevered hook.

4. The lighting device assembly of claim 3, wherein the second secure member comprises a protrusion adjacent to the depression; and the cantilevered hook catches the protrusion while being received in the depression.

5. The lighting device assembly of claim 1, wherein when the first secure member and the second secure member engage one another:

engaging of the first secure member and the second secure member pushes the plate toward the back side of the housing and pushes the backside of the housing toward the plate; and the plate directly contacts the back side of the housing.

6. The lighting device assembly of claim 1, wherein the plate comprises a first heat sink; and the back side of the housing comprises a second heat sink.

7. The lighting device assembly of claim 6, wherein when the first secure member and the second secure member engage one another:

the plate directly contacts the back side of the housing; and the first heat sink is configured to transfer heat of the driver from the first heat sink to the second heat sink by conduction.

8. The lighting device assembly of claim 1, wherein the side flange is configured to slide against the rail, from the lead-in portion to the middle portion, and then to the end portion, to engage the second secure member to the first secure member.

9. The lighting device assembly of claim 1, wherein the rail comprises a first rail and a second rail, each of the first rail and the second rail comprises the lead-in portion, the middle portion, the end portion, and the first secure member; and the side flange of the plate comprises a first side flange and a second side flange, each of the first side flange and the second side flange comprises the second secure member.

10. The lighting device assembly of claim 9, wherein the first rail and the second rail are positioned on the back side of the housing to allow the plate to slide between the first rail and the second rail.

11. The lighting device assembly of claim 10, wherein the first side flange is configured to slide against the first rail, from the lead-in portion of the first rail to the middle portion of the first rail, and then to the end portion of the first rail, to engage the second secure member of the first side flange to the first secure member of the first rail; and the second side flange is configured to slide against the second rail, from the lead-in portion of the second rail to the middle portion of the second rail, and then to the end portion of the second rail, to engage the second secure member of the second side flange to the first secure member of the second rail.

12. The lighting device assembly of claim 1, wherein the rail extends along a first direction; and the plate is configured to slide against the rail in the first direction.

13. The lighting device assembly of claim 1, wherein the middle portion of the rail comprises a ridge, the channel being formed between the ridge and the back side of the housing; and the side flange of the plate is configured to slide in the channel between the ridge and the back side of the housing.

14. The lighting device assembly of claim 1, wherein engaging the first secure member and the second secure member comprises snap fitting one of the first secure member and the second secure member to another one of the first secure member and the second secure member.

15. The lighting device assembly of claim 1, wherein the plate comprises a plurality of holes to receive screws, nails, and pins for a variety of sizes and shapes of the driver.

16. The lighting device assembly of claim 1, wherein comprises wherein the driver comprises at least one of a connector or a wire to connect the light source to a power source.

17. A rail mount system coupled to a back side of a housing, the housing being configured to support an optic assembly comprising a light source, the rail mount system comprises:

a rail coupled to the back side of the housing, wherein the rail comprises a lead-in portion, a middle portion, and an end portion, wherein the lead-in portion is recessed from the middle portion, the end portion comprises a first secure member;

a plate configured to support a driver configured to drive the light source, the plate comprises a side flange, wherein the middle portion of the rail forms a channel with the back side of the housing, wherein the side flange is configured to be received in and slidably coupled to the channel, wherein the side flange comprises a second secure member at an end of the side flange, and wherein the first secure member and the second secure member are configured to engage one another to position the plate at a predetermined position on the back side of the housing.

18. The rail mount system of claim 17, wherein the plate comprises a heat sink; and when the first secure member and the second secure member engage one another:

the plate directly contacts the back side of the housing; and the heat sink is configured to transfer heat of the driver from the heat sink to the back side by conduction.

19. The rail mount system of claim 17, wherein the middle portion of the rail comprises a ridge, the channel being formed between the ridge and the back side of the housing; and the side flange of the plate is configured to slide in the channel between the ridge and the back side of the housing.

20. A rail mount system coupled to a back side of a housing, the housing being configured to support an optic assembly comprising a light source, the rail mount system comprises:

a rail coupled to the back side of the housing, wherein the rail comprises a lead-in portion, a middle portion, and an end portion, wherein the lead-in portion is recessed from the middle portion, the end portion comprises a snap clip;

a plate configured to support a driver configured to drive the light source, the plate comprises a side flange, wherein the middle portion of the rail forms a channel with the back side of the housing, wherein the side flange is configured to be received in and slidably coupled to the channel, wherein the side flange comprises a depression and a protrusion at an end of the side flange, and wherein a snap fit is formed via the snap clip, the depression, and the protrusion, by the depression receiving the cantilevered hook while the cantilevered hook is catching the protrusion.

* * * * *